(12) United States Patent
Ren et al.

(10) Patent No.: US 11,147,075 B2
(45) Date of Patent: Oct. 12, 2021

(54) METHODS AND DEVICES OF INFORMATION TRANSMISSION USING RECEPTION INFORMATION OF RECEIVING DEVICES

(71) Applicant: Huawei Technologies Co., Ltd., Shenzhen (CN)

(72) Inventors: Yi Ren, Shenzhen (CN); Hua Li, Shanghai (CN); Zhongfeng Li, Munich (DE); Yi Qin, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 16/371,859

(22) Filed: Apr. 1, 2019

(65) Prior Publication Data
US 2019/0230673 A1     Jul. 25, 2019

Related U.S. Application Data

(63) Continuation of application No. PCT/CN2017/103866, filed on Sep. 28, 2017.

(30) Foreign Application Priority Data

Sep. 30, 2016  (CN) .............................. 1610877461.6

(51) Int. Cl.
*H04W 72/08*     (2009.01)
*H04B 7/0452*    (2017.01)
(Continued)

(52) U.S. Cl.
CPC ........ *H04W 72/082* (2013.01); *H04B 7/0417* (2013.01); *H04B 7/0452* (2013.01);
(Continued)

(58) Field of Classification Search
CPC . H04W 72/082; H04W 72/085; H04W 16/14; H04B 7/0417; H04B 7/0452;
(Continued)

(56) References Cited

U.S. PATENT DOCUMENTS

| 2013/0163457 | A1* | 6/2013 | Kim | H04W 24/02 370/252 |
| 2014/0086285 | A1* | 3/2014 | Yang | H04B 7/0691 375/219 |

(Continued)

FOREIGN PATENT DOCUMENTS

| CN | 102480756 A | 5/2012 |
| CN | 105207723 A | 12/2015 |

(Continued)

OTHER PUBLICATIONS

Cisco et al., "Verizon 5G TF; Air Interface Working Group; Verizon 5th Generation Radio Access; Physical layer procedures (Release 1)," TS V5G.213 v1.0 (Jun. 2016), 43 pages.

(Continued)

*Primary Examiner* — Ian N Moore
*Assistant Examiner* — Latresa A McCallum
(74) *Attorney, Agent, or Firm* — Slater Matsil, LLP

(57) ABSTRACT

Embodiments of this application provide an information transmission method and a device. The method includes: sending, by a first device, indication information to a second device, where the indication information is used to indicate a report mode, and the report mode specifies content of measurement information to be reported by the second device; and receiving, by the first device, the measurement information sent by the second device, where the measurement information includes a measurement result that is obtained by the second device based on a reference signal sent by the first device, the reference signal is sent through (Continued)

transmit ports of the first device, the measurement information includes information about transmit port groups corresponding to the transmit ports, and the transmit port groups corresponding to the transmit ports are determined by using reception information of the second device.

20 Claims, 5 Drawing Sheets

(51) Int. Cl.
*H04B 7/06* (2006.01)
*H04B 7/0417* (2017.01)
*H04L 5/00* (2006.01)

(52) U.S. Cl.
CPC ........... *H04B 7/0626* (2013.01); *H04L 5/006* (2013.01); *H04L 5/0044* (2013.01); *H04L 5/0053* (2013.01); *H04W 72/085* (2013.01); *H04L 5/0023* (2013.01); *H04L 5/0037* (2013.01); *H04L 5/0057* (2013.01)

(58) Field of Classification Search
CPC ... H04B 7/0626; H04B 7/0619; H04L 5/0044; H04L 5/0053; H04L 5/006; H04L 5/0023; H04L 5/0037; H04L 5/0057
See application file for complete search history.

(56) References Cited

U.S. PATENT DOCUMENTS

| | | |
|---|---|---|
| 2014/0200009 A1 | 7/2014 | Schier et al. |
| 2015/0036612 A1 | 2/2015 | Kim et al. |
| 2015/0043450 A1 | 2/2015 | Ariyavisitakul et al. |
| 2018/0102817 A1* | 4/2018 | Park .......................... H04B 7/06 |
| 2019/0109690 A1 | 4/2019 | Li et al. |

FOREIGN PATENT DOCUMENTS

| | | |
|---|---|---|
| CN | 105471552 A | 4/2016 |
| WO | 2015199414 A1 | 12/2015 |

OTHER PUBLICATIONS

Samsung, "Advanced CSI feedback for NR," 3GPP TSG RAN WG1 #86, R1-166783, Gothenburg, Sweden Aug. 22-26, 2016, 5 pages.
Samsung, "Discussions on auxiliary CSI for MU transmission," 3GPP TSG RAN WG1 #85, R1-164782, Nanjing, China, May 23-27, 2016, 3 pages.
Samsung, "DL MIMO for NR," 3GPP TSG RAN WG1 Meeting #86, R1-166781, Gothenburg, Sweden Aug. 22-26, 2016, 5 pages.
Sesia, Stefania et al., LTE—The UMTS Long Term Evolution, From Theory to Practice⊘ Second Edition, 2011, 797 pages.
ZTE Corporation, "Discussion on NR beamforming with UE-group-specific beam sweeping," 3GPP TSG-RAN WG1 Meeting #86, R1-166219, Gothenburg, Sweden, Aug. 22-26, 2016, 7 pages
ZTE Corporation, ZTE Microelectronics, "Beam selection and CSI acquisition for NR MIMO," 3GPP TSG RAN WG1 Meeting #86, R1-166212, Gothenburg, Sweden Aug. 22-26, 2016, 6 pages.

* cited by examiner

METHODS AND DEVICES OF INFORMATION TRANSMISSION USING RECEPTION INFORMATION OF RECEIVING DEVICES

CROSS-REFERENCE TO RELATED APPLICATIONS

This application is a continuation of International Application No. PCT/CN2017/103866, filed on Sep. 28, 2017, which claims priority to Chinese Patent Application No. 201610877461.6, filed on Sep. 30, 2016. The disclosures of the aforementioned applications are hereby incorporated by reference in their entireties.

TECHNICAL FIELD

This application relates to the communications field, and more specifically, to an information transmission method and a device.

BACKGROUND

In a 5th-generation (5G) mobile communications system, low frequency communication using only bands below 6 GHz cannot meet growing communication requirements. Therefore, high frequency (HF) communication using a frequency above 6 GHz attracts more attention from academic and industrial fields. However, because an HF signal has fast energy attenuation and weak penetration capability in space, leading to a signal path loss much greater than that of a low frequency signal, a gain on an antenna side needs to be used to compensate for this part of loss, to ensure coverage of an HF system. In addition, because of a shorter signal wavelength and a smaller antenna in an HF scenario, a massive MIMO technology is more suitable for the HF scenario. By using the massive MIMO technology, a first device such as a network device side can form a more energy-concentrated transmit beam in digital and analog manners to ensure system coverage, and a second device such as a terminal device side can also form a more energy-concentrated receive beam to increase a reception gain. Because an antenna array capability on the first device side is enhanced, an increasing quantity of parallel data streams can be supported. How to properly use these data streams becomes a key to improving system performance.

In the prior art, different second devices measure current channel states based on configuration of the first device by using corresponding measurement signals CSI-RSs, and then feed back all or some of the following information based on the configuration of the first device: channel state information (CSI), a channel quality indicator (CQI), a precoding matrix indicator (PMI), and a rank indicator (RI). The first device side carries out a comprehensive evaluation based on information reported by the different second devices, selects second devices suitable for MU-MIMO from the different second devices, and configures corresponding transmit resources for the second devices to perform MU-MIMO communication.

However, based on the foregoing existing solution, during MU-MIMO transmission, severe interference is caused between signals of a plurality of different second devices served by the first device simultaneously by using a multiple-antenna capability.

Therefore, how to use the multiple-antenna capability of the first device so that the signals of the plurality of simultaneously served different second devices do not cause interference or cause little interference to each other becomes a problem that needs to be resolved urgently.

SUMMARY

Embodiments of this application propose an information transmission method and a device. The method can be used to reduce interference between a plurality of signals.

According to a first aspect, an information transmission method is provided. The method includes:

sending, by a first device, indication information to a second device, where the indication information is used to indicate a report mode, and the report mode specifies content of measurement information to be reported by the second device; and receiving, by the first device, the measurement information sent by the second device, where the measurement information includes a measurement result, the measurement result is obtained by the second device based on a reference signal sent by the first device, the reference signal is sent through transmit ports of the first device, the measurement information includes information about transmit port groups corresponding to the transmit ports, and the transmit port groups corresponding to the transmit ports are determined by using reception information of the second device.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using a reception area of the second device, so that the first device can determine a transmit port set for downlink transmission based on the measurement information. In other words, in this embodiment of this application, the first device can determine, based on the measurement information determined by using the reception information, a plurality of transmit ports for sending data. Considering impact of a receive port on a MU-MIMO signal, the first device selects suitable transmit ports for simultaneous signal transmission, to avoid or reduce interference between a plurality of signals.

It should be understood that in this embodiment of this application, the noun "transmit port" may be a logical antenna port, and the transmit port may also be referred to as a transmit antenna port, a transmit beam, a transmit resource, a transmit AOA, or the like.

Similarly, the noun "receive port" may be a logical antenna port, and the receive port may also be referred to as a receive antenna port, a receive beam, a receive resource, a receive angle of arrival (AoA), or the like.

It should be understood that, the report mode in this embodiment of this application may correspond to a transmission mode in an existing standard. In other words, for each existing transmission mode, there may be a corresponding report mode in this embodiment of this application.

For example, a first transmission mode may correspond to a first report mode, and a second transmission mode may correspond to a second report mode and a third report mode.

Specifically, for a definition of the transmission mode, refer to descriptions in the existing standard. For brevity, details are not described herein.

Optionally, the measurement information further includes all or some of the following information:

a transmit port number, an identifier of a reception area group, a channel quality indicator CQI, a signal-to-noise-plus-interference ratio SINR, a rank indicator RI, and a precoding matrix indicator PMI.

With reference to the first aspect, in an implementation of the first aspect, the reception information of the second device includes information about a reception area of the second device; and one transmit port group corresponds to one reception area of the second device, each transmit port in the one transmit port group sends the reference signal, an energy value that is of the reference signal sent through each transmit port and that is detected on at least one receive port in the one reception area is greater than or equal to a preset threshold, and the reception area is determined by the second device according to a logical grouping rule.

It should be understood that in this embodiment of this application, the information about the reception area may be identification information of the reception area, or may be identification information of a receive port in the reception area, or may be identification information of a receive beam in the reception area, or may be a group number or a number of the reception area, or the like. This embodiment of this application is not limited thereto.

With reference to the first aspect and the foregoing implementation of the first aspect, in another implementation of the first aspect, the method further includes:

sending, by the first device, rule indication information to the second device, where the rule indication information is used to indicate the logical grouping rule; and the logical grouping rule includes: dividing receive ports of the second device into a plurality of reception areas based on the receive ports of the second device, angles of arrival corresponding to the transmit ports, weights of receive antennas of the second device, or receive port numbers of the second device.

With reference to the first aspect and the foregoing implementations of the first aspect, in another implementation of the first aspect, the indication information is used to indicate a channel state information CSI process, and the CSI process specifies the report mode; and the transmit ports through which the first device sends the reference signal are configured in the CSI process, and the transmit ports for the reference signal are located in a same transmit port group or different transmit port groups.

With reference to the first aspect and the foregoing implementations of the first aspect, in another implementation of the first aspect, the content of the reported measurement information that is specified in the report mode includes identifiers of N transmit ports corresponding to first N optimal reference signal strength values based on optimal reference signal strength of the reference signal that is sent through the transmit ports of the first device and that is received by the second device, and further includes identifiers of N transmit port groups corresponding to N optimal reception areas corresponding to the first N optimal reference signal strength values, and one transmit port corresponds to one optimal reception area and one optimal reference signal strength value.

With reference to the first aspect and the foregoing implementations of the first aspect, in another implementation of the first aspect, the content of the reported measurement information that is specified in the report mode further includes an identifier of a transmit port group other than the N transmit port groups in transmit port groups corresponding to the N transmit ports.

Therefore, in this embodiment of this application, the identifiers of the N transmit ports corresponding to the first N optimal reference signal strength values based on the optimal reference signal strength of the reference signal sent through the transmit ports of the first device are fed back, and the identifiers of the N transmit port groups corresponding to the N optimal reception areas corresponding to the first N optimal reference signal strength values are fed back, so that during port selection, the first device prevents, based on the information, a reception area corresponding to a relatively good transmit port group of one second device from covering a transmit port that is configured for another second device, to avoid or reduce interference between a plurality of signals.

With reference to the first aspect and the foregoing implementations of the first aspect, in another implementation of the first aspect, the content of the reported measurement information that is specified in the report mode includes identifiers of M transmit ports corresponding to first M optimal reference signal strength values and identifiers of K transmit ports corresponding to last K worst reference signal strength values based on optimal reference signal strength of the reference signal that is sent through the transmit ports of the first device and that is received by the second device, and further includes identifiers of M transmit port groups corresponding to the first M optimal reference signal strength values and identifiers of K transmit port groups corresponding to the last K worst reference signal strength values, and one transmit port corresponds to one optimal reception area group number and one optimal reference signal strength value.

Therefore, in this embodiment of this application, the identifiers of the M transmit ports corresponding to the first M optimal reference signal strength values and the identifiers of the K transmit ports corresponding to the last K worst reference signal strength values based on the optimal reference signal strength of the reference signal sent through the transmit ports of the first device are fed back, and the identifiers of the M transmit port groups corresponding to the first M optimal reference signal strength values and the identifiers of the K transmit port groups corresponding to the last K worst reference signal strength values are fed back, so that during port selection, the first device prevents, based on the information, a reception area corresponding to a relatively good transmit port group of one second device from covering a transmit port that is configured for another second device, and can set an optimal transmit port corresponding to the second device to correspond to a relatively poor transmit port group of the another second device, to reduce impact of a signal of the second device on the another second device. In this way, interference between a plurality of signals is avoided or reduced.

With reference to the first aspect and the foregoing implementations of the first aspect, in another implementation of the first aspect, the content of the reported measurement information that is specified in the report mode includes numbers of Z transmit ports corresponding to first Z optimal reference signal strength values based on signal strength of the reference signal that is sent through transmit ports in each transmit port group of the first device and that is received by the second device.

Therefore, in this embodiment of this application, the numbers of the Z transmit ports corresponding to the first Z optimal reference signal strength values based on the signal strength of the reference signal that is sent through the transmit ports in each transmit port group of the first device and that is received by the second device are fed back, so that during port selection, the first device avoids, based on the information, allocating transmit ports in a same group to different second devices. In other words, after allocating a transmit port in a group to one second device, the first device avoids allocating another reported transmit port in the group to another second device, to reduce impact of a signal of the other second device on the second device. For example, after allocating a transmit port 1 in a group (transmit port group A) to a second device A, the first device avoids allocating a transmit port 2 to a second device B, to reduce impact of a signal of the second device B on the second device A. In this way, interference between a plurality of signals is avoided or reduced.

With reference to the first aspect and the foregoing implementations of the first aspect, in another implementation of the first aspect, the content of the reported measurement information that is specified in the report mode includes an identifier of a transmit port corresponding to a highest signal strength value based on signal strength of the reference signal that is sent through transmit ports in each transmit port group of the first device and that is received by the second device, and further includes an identifier of one or more other transmit ports in a transmit port group in which the transmit port corresponding to the highest signal strength value is located.

Therefore, in this embodiment of this application, the identifier of the transmit port corresponding to the highest signal strength value based on the signal strength of the reference signal that is sent through the transmit ports in each transmit port group of the first device and that is received by the second device is fed back, and the identifier of the one or more other transmit ports in the transmit port group in which the transmit port corresponding to the highest signal strength value is located is fed back, so that during port selection, the first device avoids, based on the information, allocating transmit ports in a same group to different second devices. In other words, after allocating a transmit port in a group to one second device, the first device avoids allocating another transmit port in the group to another second device, to reduce impact of a signal of the other second device on the second device. In this way, interference between a plurality of signals is avoided or reduced.

With reference to the first aspect and the foregoing implementations of the first aspect, in another implementation of the first aspect, the method further includes:

determining, by the first device based on measurement information sent by each of a plurality of second devices, at least one transmit port set for simultaneous downlink transmission with the plurality of second devices, where a quantity of transmit ports included in each of the at least one transmit port set is equal to a quantity of the plurality of second devices, and one transmit port corresponds to one second device.

With reference to the first aspect and the foregoing implementations of the first aspect, in another implementation of the first aspect, the at least one transmit port set includes at least two transmit port sets, and the method further includes:

transmitting, by the first device, a second signal with the plurality of second devices through each transmit port in each of the at least two transmit port sets, and determining, by the first device, a transmit port set with best system performance from the at least two transmit port sets based on strength values of the second signal to perform downlink transmission with the plurality of second devices.

Therefore, in this embodiment of this application, the first device determines the transmit port set with the best system performance from the at least two transmit port sets based on signal-to-noise ratios to perform downlink transmission with the plurality of second devices, to improve system performance. The system performance may be a sum of estimated rates of all served UEs.

According to a second aspect, an information transmission method is provided. The method includes:

receiving, by a second device, indication information sent by a first device, where the indication information is used to indicate a report mode, and the report mode specifies content of measurement information to be reported by the second device; and sending, by the second device, the measurement information to the first device, where the first device receives measurement information sent by second devices, the measurement information includes a measurement result, the measurement result is obtained by the second device based on a reference signal sent by the first device, the reference signal is sent through transmit ports of the first device, the measurement information includes information about transmit port groups corresponding to the transmit ports, and the transmit port groups corresponding to the transmit ports are determined by using reception information of the second device.

Therefore, in this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using a reception area of the second device, so that the first device can determine a transmit port set for downlink transmission based on the measurement information. In other words, in this embodiment of this application, the first device can determine, based on the measurement information determined by using the reception information, a plurality of transmit ports for sending data. Considering impact of a receive port on a MU-MIMO signal, the first device selects suitable transmit ports for simultaneous signal transmission, to avoid or reduce interference between a plurality of signals.

It should be understood that, the second aspect corresponds to the first aspect, the first aspect is performed by the first device, and the second aspect may be performed by the second device. For corresponding features of the method on a second device side, refer to a corresponding description on a first device side in the first aspect. Therefore, for brevity, detailed descriptions are appropriately omitted.

With reference to the second aspect, in an implementation of the second aspect, the reception information of the second device includes information about a reception area of the second device; and one transmit port group corresponds to one reception area of the second device, an energy value that is of the reference signal sent through each transmit port in the one transmit port group and that is detected on at least one receive port in the one reception area is greater than or equal to a preset threshold, and the reception area is determined by the second device according to a logical grouping rule.

With reference to the second aspect and the foregoing implementation of the second aspect, in another implementation of the second aspect, the method further includes:

receiving, by the second device, rule indication information sent by the first device, where the rule indication information is used to indicate the logical grouping rule; and the logical grouping rule includes: dividing receive ports of the second device into a plurality of reception areas based on the receive ports of the second device, angles of arrival corresponding to the transmit ports, weights of receive antennas of the second device, or receive port numbers of the second device.

With reference to the second aspect and the foregoing implementations of the second aspect, in another implementation of the second aspect, the indication information is used to indicate a channel state information CSI process, and the CSI process specifies the report mode; and the transmit ports through which the first device sends the reference signal are configured in the CSI process, and the transmit ports for the reference signal are located in a same transmit port group or different transmit port groups.

With reference to the second aspect and the foregoing implementations of the second aspect, in another implementation of the second aspect, the information about the transmit port groups corresponding to the transmit ports includes identifiers of N transmit ports corresponding to first N optimal reference signal strength values based on optimal reference signal strength of the reference signal that is sent through the transmit ports of the first device and that is received by the second device, and further includes identifiers of N transmit port groups corresponding to N optimal reception areas corresponding to the first N optimal reference signal strength values, and one transmit port corresponds to one optimal reception area and one optimal reference signal strength value.

With reference to the second aspect and the foregoing implementations of the second aspect, in another implementation of the second aspect, the information about the transmit port groups corresponding to the transmit ports further includes an identifier of a transmit port group other than the N transmit port groups in transmit port groups corresponding to the N transmit ports.

With reference to the second aspect and the foregoing implementations of the second aspect, in another implementation of the second aspect, the information about the transmit port groups corresponding to the transmit ports includes identifiers of M transmit ports corresponding to first M optimal reference signal strength values and identifiers of K transmit ports corresponding to last K worst reference signal strength values based on optimal reference signal strength of the reference signal that is sent through the transmit ports of the first device and that is received by the second device, and further includes identifiers of M transmit port groups corresponding to the first M optimal reference signal strength values and identifiers of K transmit port groups corresponding to the last K worst reference signal strength values, and one transmit port corresponds to one optimal reception area group number and one optimal reference signal strength value.

With reference to the second aspect and the foregoing implementations of the second aspect, in another implementation of the second aspect, the information about the transmit port groups corresponding to the transmit ports includes numbers of Z transmit ports corresponding to first Z optimal reference signal strength values based on signal strength of the reference signal that is sent through transmit ports in each transmit port group of the first device and that is received by the second device.

With reference to the second aspect and the foregoing implementations of the second aspect, in another implementation of the second aspect, the information about the transmit port groups corresponding to the transmit ports includes an identifier of a transmit port corresponding to a highest signal strength value based on signal strength of the reference signal that is sent through transmit ports in each transmit port group of the first device and that is received by the second device, and further includes an identifier of one or more other transmit ports in a transmit port group in which the transmit port corresponding to the highest signal strength value is located.

With reference to the second aspect and the foregoing implementations of the second aspect, in another implementation of the second aspect, the measurement information sent by the second device is used by the first device to determine at least one transmit port set for simultaneous downlink transmission with a plurality of second devices, a quantity of transmit ports included in each of the at least one transmit port set is equal to a quantity of the plurality of second devices, and one transmit port corresponds to one second device.

With reference to the second aspect and the foregoing implementations of the second aspect, in another implementation of the second aspect, the at least one transmit port set includes at least two transmit port sets, and the method further includes:

transmitting, by the second device, a second signal with the first device, to trigger the first device to determine a transmit port set with best system performance from the at least two transmit port sets based on strength values of the second signal to perform downlink transmission with the plurality of second devices.

According to a third aspect, a first device is provided, configured to perform the method in the first aspect or any possible implementation of the first aspect. Specifically, the first device includes units configured to perform the method.

According to a fourth aspect, a second device is provided, configured to perform the method in the second aspect or any possible implementation of the second aspect. Specifically, the second device includes units configured to perform the method.

According to a fifth aspect, a first device is provided. The first device includes a processor and a memory. The memory is configured to store a computer program. The processor is configured to execute the computer program stored in the memory, to perform the method in the first aspect or any possible implementation of the first aspect.

According to a sixth aspect, a second device is provided. The second device includes a processor and a memory. The memory is configured to store a computer program. The processor is configured to execute the computer program stored in the memory, to perform the method in the second aspect or any possible implementation of the second aspect.

According to a seventh aspect, a computer-readable medium is provided, configured to store a computer program. The computer program includes instructions used to perform the method in the first aspect or any possible implementation of the first aspect.

According to an eighth aspect, a computer-readable medium is provided, configured to store a computer program. The computer program includes instructions used to perform the method in the second aspect or any possible implementation of the second aspect.

DETAILED DESCRIPTION

The following describes technical solutions in this application with reference to the accompanying drawings.

Embodiments of this application may be applied to various communications systems. Therefore, the following descriptions are not limited to particular communications systems. For example, the embodiments of this application may be applied to a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), or the like.

In the embodiments of this application, a terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless telephone set, a Session Initiation Protocol (SIP) phone, a wireless local loop (WLL) station, a personal digital assistant (PDA), a handheld device with a wireless communication function, a computing device, another processing device connected to a wireless modem, an in-vehicle device, a wearable device, or a terminal device in a future 5G network.

In the embodiments of this application, a network device may be a network side device or the like configured to communicate with a mobile device. The network side device may be a base transceiver station (BTS) in the Global System for Mobile Communications (GSM) or Code Division Multiple Access (CDMA), or may be a NodeB (NB) in Wideband Code Division Multiple Access (WCDMA), or may be an evolved NodeB (eNB or eNodeB) in Long Term Evolution (LTE), a relay station, an access point, an in-vehicle device, a wearable device, or a network side device in a future 5G network.

Figure 1:
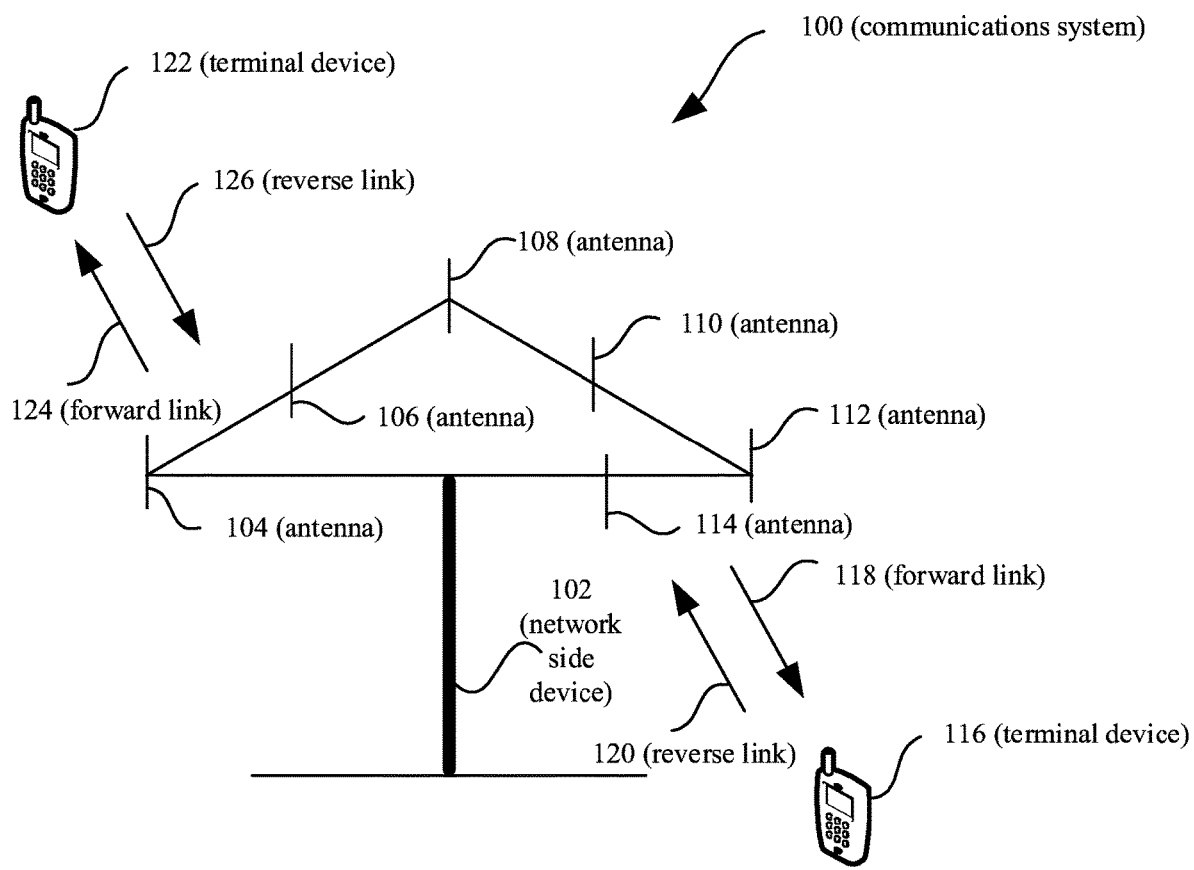
FIG. 1 is a schematic diagram of a wireless communications system according to an embodiment of this application.

FIG. 1 is a schematic diagram of a communications system using an information transmission method according to this application. The communications system may be any one of the foregoing communications systems. As shown in FIG. 1, the communications system 100 includes a network side device 102, and the network side device 102 may include a plurality of antenna groups. Each antenna group may include a plurality of antennas. For example, one antenna group may include antennas 104 and 106, another antenna group may include antennas 108 and 110, and an additional group may include antennas 112 and 114. FIG. 1 shows two antennas for each antenna group. However, more or fewer antennas may be used for each group. The network side device 102 may additionally include a transmitter chain and a receiver chain. A person of ordinary skill in the art may understand that, each of the transmitter chain and the receiver chain may include a plurality of components (for example, a processor, a modulator, a multiplexer, a demodulator, a demultiplexer, or an antenna) related to signal sending and receiving.

The network side device 102 may communicate with a plurality of terminal devices (for example, a terminal device 116 and a terminal device 122). However, it may be understood that, the network side device 102 may communicate with any quantity of terminal devices similar to the terminal device 116 or 122. Each of the terminal devices 116 and 122 may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 and the reverse link 120 may use different bands, and the forward link 124 and the reverse link 126 may use different bands.

For another example, in a time division duplex (TDD) system and a full duplex system, the forward link 118 and the reverse link 120 may use a common band, and the forward link 124 and the reverse link 126 may use a common band.

Each antenna group and/or area designed for communication is referred to as a sector of the network side device 102. For example, an antenna group may be designed to communicate with a terminal device in a sector of a coverage area of the network side device 102. When the network side device 102 communicates with the terminal devices 116 and 122 over the forward links 118 and 124 respectively, transmit antennas of the network side device 102 may increase signal-to-noise ratios of the forward links 118 and 124 through beamforming. In addition, compared with sending a signal by a network side device to all terminal devices of the network side device by using a single antenna, sending a signal by the network side device 102 to the randomly dispersed terminal devices 116 and 122 in a related coverage area through beamforming causes less interference to a mobile device in a neighboring cell.

At a given time, the network side device 102, the terminal device 116, or the terminal device 122 may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications apparatus, or store in a memory) a particular quantity of data bits that need to be sent to a wireless communications receiving apparatus through a channel. The data bits may be included in a transport block (or a plurality of transport blocks) for the data, and the transport block may be segmented to generate a plurality of code blocks.

It should be noted that, in a downlink port selection solution, a terminal device feeds back one or more strongest transmit ports and a reference signal energy value, also known as reference signal received power (RSRP) corresponding to the transmit port. Then a network device determines transmit ports for simultaneous downlink transmission based on information about strongest transmit ports that is fed back by terminal devices. However, in this solution, when the network device serves a terminal device through a transmit port, the network device cannot correctly estimate specific interference that is caused by the transmit port to another terminal device. The network device does not know a receive port of the other terminal device, and values of interference received by different receive ports from a same transmit port are different. In other words, in the existing solution, impact of interference on different receive ports cannot be considered during schedule of MU-MIMO pairing. Therefore, the network device cannot select an optimal transmit port group for MU-MIMO during decision making.

To resolve this problem, in the embodiments of this application, a first device (for example, a network device) sends indication information to instruct a second device (for example, a terminal device) to feed back measurement information that is determined by using a reception area of the second device, so that the first device can determine a transmit port set for downlink transmission based on the measurement information. In other words, in the embodiments of this application, the first device can determine transmit ports based on the measurement information determined by using the reception area (an area obtained through division of receive ports). Considering impact of a receive port on a MU-MIMO downlink signal, the first device selects suitable downlink beams for simultaneous downlink transmission, to avoid or reduce interference between a plurality of signals.

For ease of understanding and description, execution processes and actions of an information transmission method of this application in a communications system are described below for example rather than limitation.

It should be understood that in the embodiments of this application, the noun "transmit port" may be a logical antenna port, and the transmit port may also be referred to as a transmit antenna port, a transmit beam, a transmit resource, a transmit AOA, or the like.

Similarly, the noun "receive port" may be a logical antenna port, and the receive port may also be referred to as a receive antenna port, a receive beam, a receive resource, a receive angle of arrival (AoA), or the like. The nouns are not explained below one by one.

Figure 2:
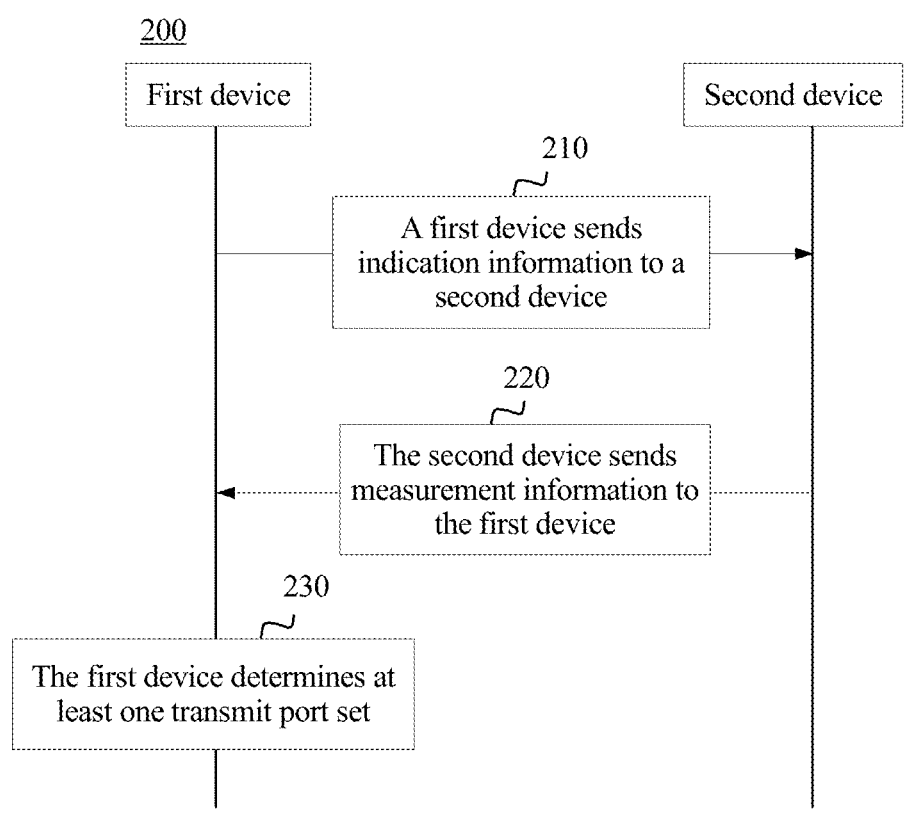
FIG. 2 is a flowchart of an information transmission method according to an embodiment of this application.

FIG. 2 is a schematic flowchart of an information transmission method according to an embodiment of this application. The method shown in FIG. 2 may be applied to the foregoing communications systems. A communications system in this embodiment of this application includes a first device and a plurality of second devices. It should be understood that in this embodiment of this application, the first device may be a network device, and the second device may be a terminal device. Alternatively, both the first device and the second device may be network devices, or both the first device and the second device may be terminal devices. The following provides detailed descriptions by using an example in which the first device is a network device and the second device is a terminal device. Specifically, the method 200 shown in FIG. 2 includes the following steps.

210. The first device sends indication information to the second device.

Specifically, the second device is any one of the plurality of second devices in the network system. In other words, the first device sends the indication information to each of the plurality of second devices. The indication information is used to indicate a report mode, and the report mode specifies content of measurement information to be reported by the second device.

It should be noted that in step 210, the first device may further send a reference signal to the second device. The indication information may be sent before the reference signal, or may be sent after the reference signal. This is not limited in this embodiment of this application.

220. The second device sends measurement information to the first device.

Specifically, the first device receives the measurement information sent by the second device. The measurement information includes a measurement result, the measurement result is obtained by the second device based on the reference signal sent by the first device, the reference signal is sent through transmit ports of the first device, the measurement information includes information about transmit port groups corresponding to the transmit ports, and the transmit port groups corresponding to the transmit ports are determined by using reception information of the second device.

It should be understood that in this embodiment of this application, information about a reception area may be identification information of the reception area, or may be identification information of a receive port in the reception area, or may be identification information of a receive beam in the reception area, or may be a group number or a number of the reception area, or the like. This embodiment of this application is not limited thereto.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using a reception area of the second device, so that the first device can determine a transmit port set for downlink transmission based on the measurement information. In other words, in this embodiment of this application, the first device can determine, based on the measurement information determined by using the reception information, a plurality of transmit ports for sending data. Considering impact of a receive port on a MU-MIMO signal, the first device selects suitable transmit ports for simultaneous signal transmission, to avoid or reduce interference between a plurality of signals.

It should be understood that, the report mode in this embodiment of this application may correspond to a transmission mode in an existing standard. In other words, for each existing transmission mode, there may be a corresponding report mode in this embodiment of this application.

For example, a first transmission mode may correspond to a first report mode, and a second transmission mode may correspond to a second report mode and a third report mode. Specifically, for a definition of the transmission mode, refer to descriptions in the existing standard. For brevity, details are not described herein.

Optionally, in another embodiment, the measurement information further includes all or some of the following information:

a transmit port number, an identifier of a reception area group, a channel quality indicator CQI, a signal-to-noise-plus-interference ratio SINR, a rank indicator RI, and a precoding matrix indicator PMI.

Optionally, the indication information is used to indicate a channel state information CSI process, and the CSI process specifies the report mode; and the transmit ports through which the first device sends the reference signal are configured in the CSI process, and the transmit ports for the reference signal are located in a same transmit port group or different transmit port groups.

It should be understood that, the reception information of the second device may include information about a reception area of the second device. In this embodiment of this application, one transmit port group corresponds to one reception area of the second device, each transmit port in the one transmit port group sends the reference signal, an energy value that is of the reference signal sent through each transmit port and that is detected on at least one receive port in the one reception area is greater than or equal to a preset threshold, and the reception area is determined by the second device according to a logical grouping rule.

In other words, the second device may first perform division according to the logical grouping rule to obtain reception areas of the second device. Then the second device may divide a plurality of transmit ports of the first device into a plurality of transmit port groups based on the reception areas.

It should be understood that, the logical grouping rule may include dividing receive ports of the second device into a plurality of reception areas based on at least one of the following information: the receive ports of the second device, angles of arrival corresponding to the transmit ports, weights of receive antennas of the second device, or receive port numbers of the second device.

Figure 3:
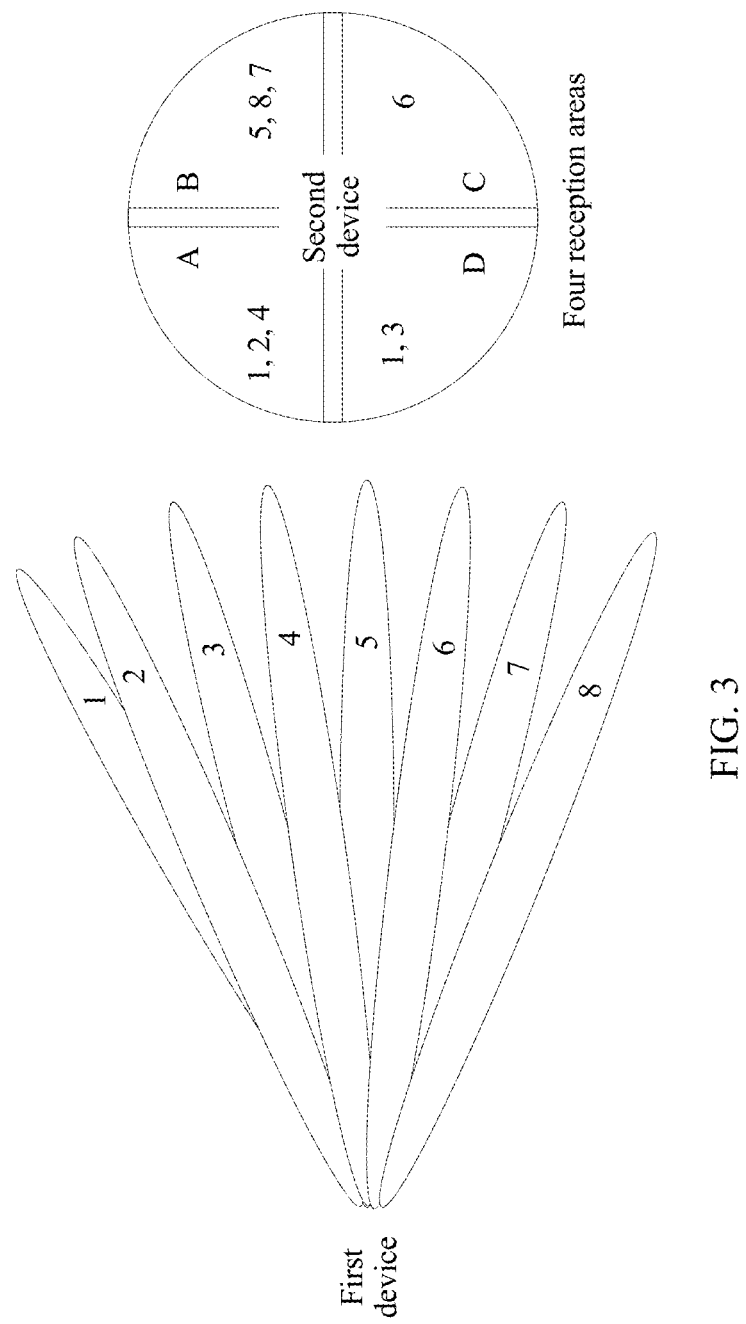
FIG. 3 is a schematic diagram of a reception area of a terminal device according to an embodiment of this application.

For example, as shown in FIG. 3, the second device may have four reception areas A, B, C, and D after division according to the logical grouping rule, and the second device may divide the plurality of transmit ports of the first device into groups based on the four reception areas.

A specific transmit port grouping process of the second device is described below with reference to FIG. 3. During measurement in the reception area A, if RSRP values that are of the reference signal transmitted through transmit ports 1, 2, and 4 and that are detected on a receive port in the reception area A are all greater than or equal to a preset threshold (or referred to as a threshold), the transmit ports 1, 2, and 4 all belong to a transmit port group A corresponding to the reception area A. Division is performed in such a manner to obtain transmit port groups. Apparently, a same transmit port may belong to a plurality of transmit port groups. For example, the transmit port 1 belongs to the transmit port group A, and may also belong to a transmit port group D. A transmit port group may include transmit ports, or may not include any transmit port.

It should be understood that in this embodiment of this application, when the second device is rotated, the division into the transmit port groups may or may not be related to rotation of the second device. This is not limited in this embodiment of this application.

It should be noted that in this embodiment of this application, the logical grouping rule may be predefined in the network system, or may be indicated by the first device to the second device. This is not limited in this embodiment of this application.

When the logical grouping rule is indicated by the first device, the method may further include: sending, by the first device, rule indication information to the second device, where the rule indication information is used to indicate the logical grouping rule.

It should be noted that in this embodiment of this application, the content of the reported measurement information that is specified in the report mode may have a plurality of forms, which are separately described in detail in cases.

Case 1:

The content of the reported measurement information that is specified in the report mode includes identifiers of N transmit ports corresponding to first N optimal reference signal strength values based on optimal reference signal strength of the reference signal that is sent through the transmit ports of the first device and that is received by the second device, and further includes identifiers of N transmit port groups corresponding to N optimal reception areas corresponding to the first N optimal reference signal strength values, and one transmit port corresponds to one optimal reception area and one optimal reference signal strength value.

Further, in the case 1, the content of the reported measurement information that is specified in the report mode may further include an identifier of a transmit port group other than the N optimal reception areas in transmit port groups corresponding to the N transmit ports.

Further, in the case 1, the content of the reported measurement information that is specified in the report mode may further include the first N optimal reference signal strength values based on the optimal reference signal strength of the reference signal that is sent through the transmit ports of the first device and that is received by the second device.

Therefore, in this embodiment of this application, the identifiers of the N transmit ports corresponding to the first N optimal reference signal strength values based on the optimal reference signal strength of the reference signal sent through the transmit ports of the first device are fed back, and the identifiers of the N transmit port groups corresponding to the N optimal reception areas corresponding to the first N optimal reference signal strength values are fed back, so that during port selection, the first device prevents, based on the information, a reception area corresponding to a relatively good transmit port group of one second device from covering a transmit port that is configured for another second device, to avoid or reduce interference between a plurality of signals.

Case 2:

The content of the reported measurement information that is specified in the report mode includes identifiers of M transmit ports corresponding to first M optimal reference signal strength values and identifiers of K transmit ports corresponding to last K worst reference signal strength values based on optimal reference signal strength of the reference signal that is sent through the transmit ports of the first device and that is received by the second device, and further includes identifiers of M transmit port groups corresponding to the first M optimal reference signal strength values and identifiers of K transmit port groups corresponding to the last K worst reference signal strength values, and one transmit port corresponds to one optimal reception area group number and one optimal reference signal strength value.

Further, in the case 2, the content of the reported measurement information that is specified in the report mode may further include the first M optimal reference signal strength values and the last K worst reference signal strength values based on the optimal reference signal strength of the reference signal that is sent through the transmit ports of the first device and that is received by the second device.

Therefore, in this embodiment of this application, the identifiers of the M transmit ports corresponding to the first M optimal reference signal strength values and the identifiers of the K transmit ports corresponding to the last K worst reference signal strength values based on the optimal reference signal strength of the reference signal sent through the transmit ports of the first device are fed back, and the identifiers of the M transmit port groups corresponding to the first M optimal reference signal strength values and the identifiers of the K transmit port groups corresponding to the last K worst reference signal strength values are fed back, so that during port selection, the first device prevents, based on the information, a reception area corresponding to a relatively good transmit port group of one second device from covering a transmit port that is configured for another second device, and can set an optimal transmit port corresponding to the second device to correspond to a relatively poor transmit port group of the another second device, to reduce impact of a signal of the second device on the other second device. In this way, interference between a plurality of signals is avoided or reduced.

Case 3:

The content of the reported measurement information that is specified in the report mode includes numbers of Z transmit ports corresponding to first Z optimal reference signal strength values based on signal strength of the reference signal that is sent through transmit ports in each transmit port group of the first device and that is received by the second device.

Further, in the case 3, the content of the reported measurement information that is specified in the report mode may further include the first Z optimal reference signal strength values based on the signal strength of the reference signal that is sent through the transmit ports in each transmit port group of the first device and that is received by the second device.

Therefore, in this embodiment of this application, the numbers of the Z transmit ports corresponding to the first Z optimal reference signal strength values based on the signal strength of the reference signal that is sent through the transmit ports in each transmit port group of the first device and that is received by the second device are fed back, so that during port selection, the first device avoids, based on the information, allocating transmit ports in a same group to different second devices. In other words, after allocating a transmit port in a group to one second device, the first device avoids allocating another reported transmit port in the group to another second device, to reduce impact of a signal of the other second device on the second device. In this way, interference between a plurality of signals is avoided or reduced.

Case 4:

The content of the reported measurement information that is specified in the report mode includes an identifier of a transmit port corresponding to a highest signal strength value based on signal strength of the reference signal that is sent through transmit ports in each transmit port group of the first device and that is received by the second device, and further includes an identifier of one or more other transmit ports in a transmit port group in which the transmit port corresponding to the highest signal strength value is located.

Further, in the case 4, the content of the reported measurement information that is specified in the report mode may further include the highest signal strength value based on the signal strength of the reference signal that is sent through the transmit ports in each transmit port group of the first device and that is received by the second device.

Therefore, in this embodiment of this application, the identifier of the transmit port corresponding to the highest signal strength value based on the signal strength of the reference signal that is sent through the transmit ports in each transmit port group of the first device and that is received by the second device is fed back, and the identifier of the one or more other transmit ports in the transmit port group in which the transmit port corresponding to the highest signal strength value is located is fed back, so that during port selection, the first device avoids, based on the information, allocating transmit ports in a same group to different second devices. In other words, after allocating a transmit port in a group to one second device, the first device avoids allocating another transmit port in the group to another second device, to reduce impact of a signal of the other second device on the second device. In this way, interference between a plurality of signals is avoided or reduced.

Therefore, based on the foregoing technical solutions, during port selection, the first device can properly select, from different transmit port groups based on a system requirement, transmit ports for a series of solutions facilitating robust transmission, such as transmit diversity and dynamic transmit port switching, to avoid or reduce interference between a plurality of signals.

230. The first device determines at least one transmit port set.

Specifically, the first device determines, based on measurement information sent by each of the plurality of second devices, the at least one transmit port set for simultaneous downlink transmission with the plurality of second devices.

A quantity of transmit ports included in each of the at least one transmit port set is equal to a quantity of the plurality of second devices, and one transmit port corresponds to one second device.

It should be understood that, the at least one transmit port set is at least one transmit port set with relatively good system performance in a plurality of transmit port sets. In other words, downlink data that is sent through corresponding transmit ports in the at least one transmit port set and that is received through corresponding receive ports by second devices has relatively good signal quality, and the downlink data sent through the transmit ports causes little interference to each other.

A specific process in which the first device determines a transmit port set based on measurement information is illustratively described in detail below with reference to the foregoing four cases.

Figure 4:
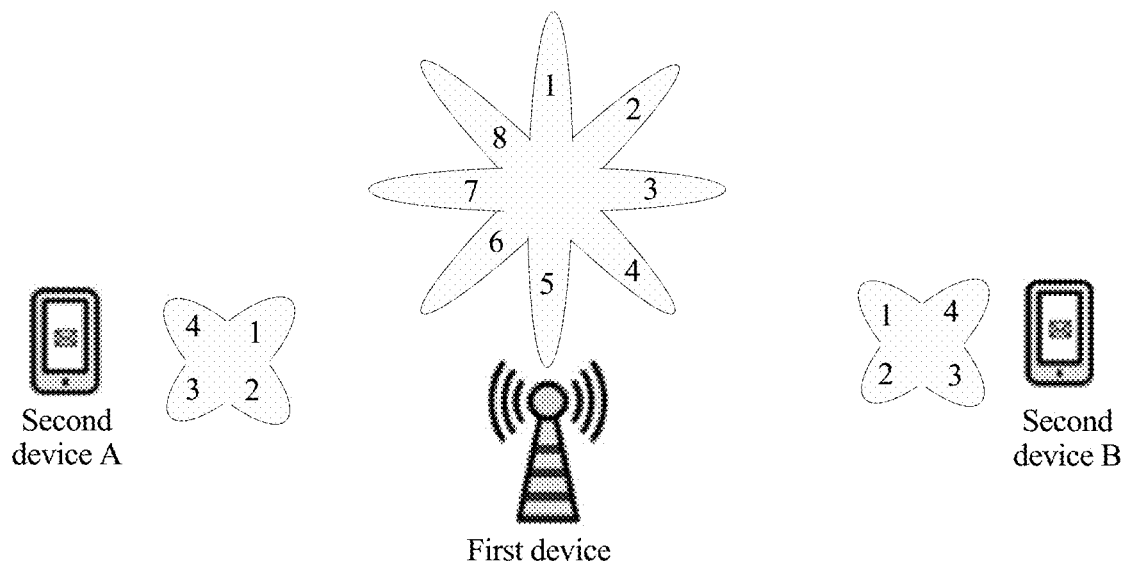
FIG. 4 is a schematic diagram of a communications system according to an embodiment of this application.

For the case 1, for example, as shown in FIG. 4, the communications system includes two second devices: a second device A and a second device B, and each second device has four receive ports. The first device, for example, a network device, has eight transmit ports in total. The first device first sends a reference signal through the eight transmit ports. In a port scan and measurement process, the second device scans the receive ports of the second device for each transmit port, performs measurement according to the case 1 to obtain measurement information, and stores the measurement information. After the measurement is completed, the first device delivers indication information to the second device. The indication information specifies a report mode of the second device. In this embodiment, the second device reports the measurement information according to the case 1. For example, the second device A may perform grouping in the grouping manner in FIG. 3. For example, the measurement information reported by the second device A may include identifiers of three transmit ports corresponding to first three optimal reference signal strength values, and identifiers of three transmit port groups corresponding to three optimal reception areas corresponding to the first three optimal reference signal strength values. Specifically, the measurement information reported by the second device A may include the following content:

first optimal transmit port being transmit port 1; transmit port group A;

second optimal transmit port being transmit port 4; transmit port group A; and third optimal transmit port being transmit port 3; transmit port group D.

Similarly, assuming that the second device B may perform grouping in the grouping manner in FIG. 3, information reported by the second device B may include the following content:

first optimal transmit port being transmit port 4; transmit port group A;

second optimal transmit port being transmit port 3; transmit port group D; and third optimal transmit port being transmit port 7; transmit port group B.

Optionally, in the case 1, the information about the transmit port groups corresponding to the transmit ports may further include the first N (for example, N=3) optimal reference signal strength values based on the optimal reference signal strength of the reference signal that is sent through the transmit ports of the first device and that is received by the second device.

For example, the measurement information reported by the second device A may include the following content:

first optimal transmit port being transmit port 1, whose RSRP is −40; transmit port group A;

second optimal transmit port being transmit port 4, whose RSRP is −50; transmit port group A; and third optimal transmit port being transmit port 3, whose RSRP is −55; transmit port group D.

The information reported by the second device B may include the following content:

first optimal transmit port being 4, whose RSRP is −40; transmit port group A;

second optimal transmit port being 3, whose RSRP is −45; transmit port group D; and third optimal transmit port being 7, whose RSRP is −60; transmit port group B.

The first device makes a proper schedule based on the reported information, and selects an optimal transmit port combination that can simultaneously serve the second device A and the second device B. For example, in this embodiment, after obtaining the information, the first device hypothetically uses the transmit port 1 to serve the second device A, and then selects a transmit port for the second device B based on this assumption. If the first device selects the optimal transmit port 4 reported by the second device B to serve the second device B, the port may cause great interference to the second device A. The first device learns that when the first device uses the port 1 to serve the second device A, A performs reception by using a reception area A corresponding to the transmit port group A, but the second piece of information reported by the second device A also shows that, A suffers interference from the port 4 in the reception area A. Therefore, the first device cannot configure the transmit port 4 for the second device B. If the first device configures the transmit port 3 for the second device B, it is found by querying the measurement information reported by the second device A that the transmit port 3 may transmit downlink data to the second device B because the transmit port 3 corresponds to a reception area D while A works by using the reception area A. It is a good choice to configure the transmit port 3 for B. However, in a conventional solution, because the transmit port 3 is still in a set of strongest transmit ports reported by A, the optimal solution of "configuring the transmit port 3 for the second device B" cannot be obtained based on the provided information.

After determining the downlink port set, the first device can directly serve different second devices through different transmit ports in the determined transmit port set. For example, the first device may simultaneously transmit downlink data to the second device A and the second device B through the transmit port 1 and the transmit port 3. After receiving the transmit port and determining the transmit port number, the second device selects, based on the previous measurement result, a receive port corresponding to the transmit port for reception.

It should be noted that, in the case 1, the information about the transmit port groups corresponding to the transmit ports may further include the identifier of the transmit port group other than the N optimal reception areas in the transmit port groups corresponding to the N transmit ports.

In other words, in addition to the identifiers of the transmit port groups corresponding to the optimal reference signal strength values, the identifier of the transmit port group other than the N transmit port groups in the transmit port groups corresponding to the transmit ports corresponding to the optimal reference signal strength values may be further fed back.

For example, for the second device A, because the transmit port 1 corresponds to the transmit port group A and the transmit port group D, the measurement information reported by the second device A may include the following content:

first optimal transmit port being transmit port 1; transmit port group A; transmit port group D;

second optimal transmit port being transmit port 4; transmit port group A; and third optimal transmit port being transmit port 3; transmit port group D.

The measurement information reported by the second device B may be determined according to this rule, and details are not described.

Specifically, when determining the transmit port set in the foregoing process, the first device further avoids allocating a transmit port in the transmit port group corresponding to the second device A to another second device, to reduce interference of a signal of the other second device to the second device A. To avoid repetition, the specific process in which the first device determines the transmit port set is not described in detail herein again.

Therefore, in this embodiment of this application, the identifiers of the N transmit ports corresponding to the first N optimal reference signal strength values based on the optimal reference signal strength of the reference signal sent through the transmit ports of the first device are fed back, and the identifiers of the N transmit port groups corresponding to the N optimal reception areas corresponding to the first N optimal reference signal strength values are fed back, so that during port selection, the first device prevents, based on the information, a reception area corresponding to a relatively good transmit port group of one second device from covering a transmit port that is configured for another second device, to avoid or reduce interference between a plurality of signals.

For the case 2, for example, as shown in FIG. 4, the communications system includes two second devices: a second device A and a second device B, and each second device has four receive ports. The first device, for example, a network device, has eight transmit ports in total. The first device first sends a reference signal through the eight transmit ports. In a port scan and measurement process, the second device scans the receive ports of the second device for each transmit port, performs measurement according to the case 2 to obtain measurement information, and stores the measurement information. After the measurement is completed, the first device delivers indication information to the second device. The indication information specifies a report mode of the second device. In this embodiment, the second device reports the measurement information according to the case 2. For example, the second device A may perform grouping in the grouping manner in FIG. 3. For example, the measurement information reported by the second device A may include identifiers of three transmit ports corresponding to first three optimal reference signal strength values and identifiers of two transmit ports corresponding to last two worst reference signal strength values, and further include identifiers of three transmit port groups corresponding to the first two optimal reference signal strength values and identifiers of two transmit port groups corresponding to the last three worst reference signal strength values. Specifically, the measurement information reported by the second device A may include the following content:

first optimal transmit port being transmit port 1; transmit port group A;

second optimal transmit port being transmit port 4; transmit port group A;

third optimal transmit port being transmit port 3; transmit port group D;

second worst transmit port being transmit port 5; transmit port group B; and first worst transmit port being transmit port 6; transmit port group C.

Similarly, assuming that the second device B may perform grouping in the grouping manner in FIG. 3, information reported by the second device B may include the following content:

first optimal transmit port being 4; transmit port group A;

second optimal transmit port being 3; transmit port group D;

third optimal transmit port being 7; transmit port group B;

second worst transmit port being transmit port 5; transmit port group B; and first worst transmit port being transmit port 2; transmit port group A.

Further, in the case 2, the information about the transmit port groups corresponding to the transmit ports may further include the first M optimal reference signal strength values and the last K worst reference signal strength values based on the optimal reference signal strength of the reference signal that is sent through the transmit ports of the first device and that is received by the second device.

Specifically, corresponding reference signal strength values may be added to the reported information. To avoid repetition, details are not described herein.

A transmit port determining method for the first device in the case 2 is similar to that in the case 1, and a difference lies in that, in the case 2, when determining a transmit port, the first device may set an optimal transmit port corresponding to the second device A to correspond to a relatively poor transmit port group of another second device. This can reduce impact of a signal of the second device A on the other second device.

After determining the downlink port set, the first device can directly serve different second devices through different transmit ports in the determined transmit port set. For example, the first device may simultaneously transmit downlink data to the second device A and the second device B through the transmit port 1 and the transmit port 3. After receiving the transmit port and determining the transmit port number, the second device selects, based on the previous measurement result, a receive port corresponding to the transmit port for reception.

Therefore, in this embodiment of this application, the identifiers of the M transmit ports corresponding to the first M optimal reference signal strength values and the identifiers of the K transmit ports corresponding to the last K worst reference signal strength values based on the optimal reference signal strength of the reference signal sent through the transmit ports of the first device are fed back, and the identifiers of the M transmit port groups corresponding to the first M optimal reference signal strength values and the identifiers of the K transmit port groups corresponding to the last K worst reference signal strength values are fed back, so that during port selection, the first device prevents, based on the information, a reception area corresponding to a relatively good transmit port group of one second device from covering a transmit port that is configured for another second device, and can set an optimal transmit port corresponding to the second device to correspond to a relatively poor transmit port group of the another second device, to reduce impact of a signal of the second device on the another second device. In this way, interference between a plurality of signals is avoided or reduced.

For the case 3, for example, as shown in FIG. 4, the communications system includes two second devices: a second device A and a second device B, and each second device has four receive ports. The first device, for example, a network device, has eight transmit ports in total. The first device first sends a reference signal through the eight transmit ports. In a port scan and measurement process, the second device scans the receive ports of the second device for each transmit port, performs measurement according to the case 3 to obtain measurement information, and stores the measurement information. After the measurement is completed, the first device delivers indication information to the second device. The indication information specifies a report mode of the second device. In this embodiment, the second device reports the measurement information according to the case 3. For example, the second device A may perform grouping in the grouping manner in FIG. 3. For example, the measurement information reported by the second device A may include identifiers of two transmit port corresponding to first two optimal reference signal strength values based on signal strength of received reference signal that is sent through transmit ports in each transmit port group of the first device.

Specifically, the measurement information reported by the second device A may include the following content:

transmit port group A, corresponding to first optimal transmit ports being transmit port 1 and transmit port 2;

transmit port group B, corresponding to first optimal transmit ports being transmit port 3 and transmit port 1;

transmit port group C, corresponding to first optimal transmit ports being transmit port 5 and transmit port 7; and transmit port group D, corresponding to a first optimal transmit port being transmit port 6.

Similarly, assuming that the second device B may perform grouping in the grouping manner in FIG. 3, information reported by the second device B may include the following content:

transmit port group A, corresponding to first optimal transmit ports being transmit port 2 and transmit port 4;

transmit port group B, corresponding to first optimal transmit ports being transmit port 3 and transmit port 1;

transmit port group C, corresponding to first optimal transmit ports being transmit port 7 and transmit port 5; and transmit port group D, corresponding to a first optimal transmit port being transmit port 6.

Further, in the case 3, the information about the transmit port groups corresponding to the transmit ports may further include the first Z optimal reference signal strength values based on the signal strength of the reference signal that is sent through the transmit ports in each transmit port group of the first device and that is received by the second device.

Specifically, corresponding reference signal strength values may be added to the reported information to obtain the information about the transmit port groups. To avoid repetition, details are not described herein.

The first device makes a proper schedule based on the reported information, and selects an optimal transmit port combination that can simultaneously serve the second device A and the second device B. For example, in this embodiment, after obtaining the information, the first device hypothetically uses the transmit port 1 to serve the second device A, and then selects a transmit port for the second device B based on this assumption. If the first device selects the optimal transmit port 2 reported by the second device B to serve the second device B, the port 2 may cause great interference to the second device A. The first device learns that when the first device uses the port 1 to serve the second device A, A performs reception by using a reception area A corresponding to the transmit port group A, but the first piece of information reported by the second device A also shows that, A suffers interference from the port 2 in the reception area A. Therefore, the first device cannot configure the receive port 2 for the second device B. If the first device configures the transmit port 3 for the second device B, it is found by querying the measurement information reported by the second device A that the transmit port 3 does not affect the reception area A if A works by using the reception area A. However, for the second device B, the transmit port 1 serving the second device A also falls within the transmit port group B of the second device B. Therefore, much interference may also be caused if the transmit port 3 is configured for the second device B. Then, it is a good choice to configure the transmit port 7 for the second device B. Therefore, the transmit port 7 may transmit downlink data to the second device B. It is a good choice to configure the transmit port 7 for B.

After determining the downlink port set, the first device can directly serve different second devices through different transmit ports in the determined transmit port set. For example, the first device may simultaneously transmit downlink data to the second device A and the second device B through the transmit port 1 and the transmit port 7. After receiving the transmit port and determining the transmit port number, the second device selects, based on the previous measurement result, a receive port corresponding to the transmit port for reception.

Therefore, in this embodiment of this application, the numbers of the Z transmit ports corresponding to the first Z optimal reference signal strength values based on the signal strength of the reference signal that is sent through the transmit ports in each transmit port group of the first device and that is received by the second device are fed back, so that during port selection, the first device avoids, based on the information, allocating transmit ports in a same group to different second devices. In other words, after allocating a transmit port in a group to one second device, the first device avoids allocating another reported transmit port in the group to another second device, to reduce impact of a signal of the other second device on the second device. For example, after allocating a transmit port 1 in a group (transmit port group A) to the second device A, the first device avoids allocating a transmit port 2 to the second device B, to reduce impact of a signal of the second device B on the second device A. In this way, interference between a plurality of signals is avoided or reduced.

For the case 4, for example, as shown in FIG. 4, the communications system includes two second devices: a second device A and a second device B, and each second device has four receive ports. The first device, for example, a network device, has eight transmit ports in total. The first device first sends a reference signal through the eight transmit ports. In a port scan and measurement process, the second device scans the receive ports of the second device for each transmit port, performs measurement according to the case 4 to obtain measurement information, and stores the measurement information. After the measurement is completed, the first device delivers indication information to the second device. The indication information specifies a report mode of the second device. In this embodiment, the second device reports the measurement information according to the case 4. For example, the second device A may perform grouping in the grouping manner in FIG. 3. For example, the measurement information reported by the second device A may include an identifier of a transmit port corresponding to an optimal reference signal strength value in signal strength of received reference signal that is sent through transmit ports in each transmit port group of the first device, and further include an identifier of one or more other transmit ports in each transmit port group.

Specifically, the measurement information reported by the second device A may include the following content:

transmit port group A, corresponding to a first optimal transmit port being transmit port 1, and identifiers of other transmit ports being transmit port 2 and transmit port 4;

transmit port group B, corresponding to a first optimal transmit port being transmit port 3, and an identifier of another transmit port being transmit port 1;

transmit port group C, corresponding to a first optimal transmit port being transmit port 5, and identifiers of other transmit ports being transmit port 7 and transmit port 8; and transmit port group D, corresponding to a first optimal transmit port being transmit port 6.

Similarly, assuming that the second device B may perform grouping in the grouping manner in FIG. 3, information reported by the second device B may include the following content:

transmit port group A, corresponding to a first optimal transmit port being transmit port 2, and identifiers of other transmit ports being transmit port 4 and transmit port 1;

transmit port group B, corresponding to a first optimal transmit port being transmit port 3, and an identifier of another transmit port being transmit port 1;

transmit port group C, corresponding to a first optimal transmit port being transmit port 7, and identifiers of other transmit ports being transmit port 5 and transmit port 8; and transmit port group D, corresponding to a first optimal transmit port being transmit port 6.

Further, in the case 4, the information about the transmit port groups corresponding to the transmit ports may further include the highest signal strength in the signal strength of the reference signal that is sent through the transmit ports in each transmit port group of the first device and that is received by the second device.

Specifically, a corresponding reference signal strength value may be added to the reported information to obtain the information about the transmit port groups. To avoid repetition, details are not described herein.

The first device makes a proper schedule based on the reported information, and selects an optimal transmit port combination that can simultaneously serve the second device A and the second device B. For example, in this embodiment, after obtaining the information, the first device hypothetically uses the transmit port 1 to serve the second device A, and then selects a transmit port for the second device B based on this assumption. If the first device selects the optimal transmit port 2 reported by the second device B to serve the second device B, the port 2 may cause great interference to the second device A. The first device learns that when the first device uses the port 1 to serve the second device A, A performs reception by using a reception area A corresponding to the transmit port group A, but the first piece of information reported by the second device A also shows that, A suffers interference from the port 2 in the reception area A. Therefore, the first device cannot configure the receive port 2 for the second device B. If the first device configures the transmit port 3 for the second device B, it is found by querying the measurement information reported by the second device A that the transmit port 3 may transmit downlink data to the second device B because the transmit port 3 does not affect the reception area A if A works by using the reception area A.

It is a good choice to configure the transmit port 3 for B.

After determining the downlink port set, the first device can directly serve different second devices through different transmit ports in the determined transmit port set. For example, the first device may simultaneously transmit downlink data to the second device A and the second device B through the transmit port 1 and the transmit port 3. After receiving the transmit port and determining the transmit port number, the second device selects, based on the previous measurement result, a receive port corresponding to the transmit port for reception.

Therefore, in this embodiment of this application, the identifier of the transmit port corresponding to the highest signal strength value based on the signal strength of the reference signal that is sent through the transmit ports in each transmit port group of the first device and that is received by the second device is fed back, and the identifier of the one or more other transmit ports in the transmit port group in which the transmit port corresponding to the highest signal strength value is located is fed back, so that during port selection, the first device avoids, based on the information, allocating transmit ports in a same group to different second devices. In other words, after allocating a transmit port in a group to one second device, the first device avoids allocating another transmit port in the group to another second device, to reduce impact of a signal of the other second device on the second device. In this way, interference between a plurality of signals is avoided or reduced.

Therefore, based on the foregoing technical solutions, during port selection, the first device can properly select, from different transmit port groups based on a system requirement, transmit ports for a series of solutions facilitating robust transmission, such as transmit diversity and dynamic transmit port switching, to avoid or reduce interference between a plurality of signals.

It should be understood that in this embodiment of this application, in step 230, after determining the at least one transmit port set, the first device may perform data transmission by using any one of the at least one transmit port set.

Optionally, the at least one transmit port set includes at least two transmit port sets, and the method may further include:

transmitting, by the first device, a second signal with the plurality of second devices through each transmit port in each of the at least two transmit port sets, and determining, by the first device, a transmit port set with best system performance from the at least two transmit port sets based on strength values of the second signal to perform downlink transmission with the plurality of second devices.

For example, the first device may determine the transmit port set with the best system performance from the at least two transmit port sets by using signal-to-noise ratios to perform downlink transmission with the plurality of second devices.

Specifically, the first device sends a second reference signal to the plurality of second devices through each transmit port in each of the at least two transmit port sets.

The first device receives a reference signal strength ratio that is sent by each of the plurality of second devices and that corresponds to each transmit port set. The reference signal strength ratio sent by the second device includes a ratio of a strength value of the reference signal received by a first receive port of the second device to a strength value of the second reference signal that is sent through a transmit port other than a transmit port corresponding to the second device in each transmit port set and that is received through the first receive port.

The first device determines, based on the reference signal strength ratio that is sent by each of the plurality of second devices and that corresponds to each transmit port set, the transmit port set with the system performance from the at least two transmit port sets to perform downlink transmission with the plurality of second devices.

Therefore, in this embodiment of this application, the first device determines the transmit port set with the best system performance from the at least two transmit port sets based on the signal-to-noise ratios to perform downlink transmission with the plurality of second devices, to improve system performance. The system performance may be a sum of estimated rates of all served UEs.

For another example, the first device may determine the transmit port set with the best system performance from the at least two transmit port sets by using reciprocity of uplink and downlink signals to perform downlink transmission with the plurality of second devices.

Specifically, the first device sends control signaling to the plurality of second devices. The control signaling is used to instruct each of the plurality of second devices to determine a transmit port of each second device based on the at least two transmit port sets. A direction of the transmit port of the second device is consistent with a direction of a receive port, corresponding to each transmit port set, of the second device.

The first device receives, through each receive port of the first device, an uplink reference signal that is sent by each of the plurality of second devices through the transmit port of each device. A direction of the receive port of the first device is consistent with a direction of a transmit port in each transmit port set of the first device.

The first device determines, based on the uplink reference signal that is sent by each of the plurality of second devices through the transmit port of each second device, the transmit port set with the system performance from the at least two groups of transmit ports to perform downlink transmission with the plurality of second devices.

Therefore, in this embodiment of this application, the first device determines the transmit port set with the best system performance from the at least two transmit port sets based on the signal-to-noise ratios to perform downlink transmission with the plurality of second devices, to improve system performance. The system performance may be a sum of estimated rates of all served UEs.

The information transmission method in the embodiments of this application is described in detail above with reference to FIG. 1 to FIG. 4. It should be noted that, the examples of FIG. 1 to FIG. 4 are intended only to help a person skilled in the art understand the embodiments of this application, but not to limit the embodiments of this application to the specific values or the specific scenarios described as examples. Apparently, a person skilled in the art may make various equivalent modifications and variations based on the provided examples of FIG. 1 to FIG. 4, and such modifications or variations also fall within the scope of the embodiments of this application.

It should be understood that, sequence numbers of the foregoing processes do not mean particular execution sequences. The execution sequences of the processes should be determined based on functions and internal logic of the processes, and should not be construed as any limitation on the implementation processes of the embodiments of this application.

Figure 5:
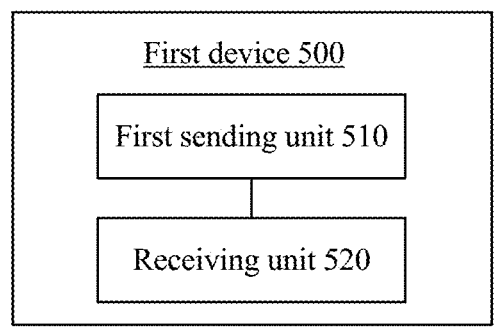
FIG. 5 is a schematic block diagram of a first device according to an embodiment of this application.
Figure 6:
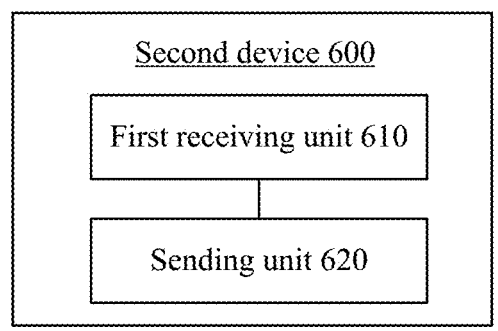
FIG. 6 is a schematic block diagram of a second device according to an embodiment of this application.
Figure 7:
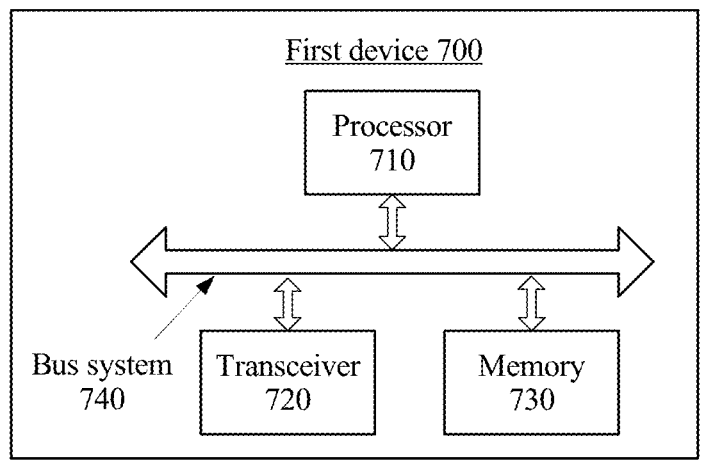
FIG. 7 is a schematic block diagram of a first device according to another embodiment of this application.
Figure 8:
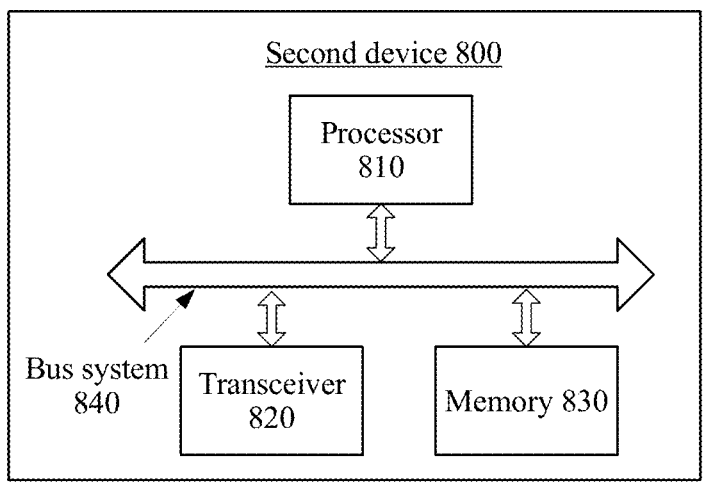
FIG. 8 is a schematic block diagram of a second device according to another embodiment of this application.

The following describes a first device according to embodiments of this application with reference to FIG. 5 and FIG. 7, and describes a second device according to embodiments of this application with reference to FIG. 6 and FIG. 8.

It should be understood that in the embodiments of this application, the first device may be a network device, and the second device may be a terminal device. Alternatively, both the first device and the second device may be network devices, or both the first device and the second device may be terminal devices. The embodiments of this application are not limited thereto.

FIG. 5 is a schematic block diagram of a first device 500 according to an embodiment of this application. Specifically, as shown in FIG. 5, the first device 500 includes:

a first sending unit 510, configured to send indication information to the second device, where the indication information is used to indicate a report mode, and the report mode specifies content of measurement information to be reported by the second device; and a receiving unit 520, configured to receive the measurement information sent by the second device, where the measurement information includes a measurement result, the measurement result is obtained by the second device based on a reference signal sent by the first device, the reference signal is sent through transmit ports of the first device, the measurement information includes information about transmit port groups corresponding to the transmit ports, and the transmit port groups corresponding to the transmit ports are determined by using reception information of the second device.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using a reception area of the second device, so that the first device can determine a transmit port set for downlink transmission based on the measurement information. In other words, in this embodiment of this application, the first device can determine, based on the measurement information determined by using the reception information, a plurality of transmit ports for sending data. Considering impact of a receive port on a MU-MIMO signal, the first device selects suitable transmit ports for simultaneous signal transmission, to avoid or reduce interference between a plurality of signals.

Optionally, in another embodiment, the reception information of the second device includes information about a reception area of the second device; and one transmit port group corresponds to one reception area of the second device, each transmit port in the one transmit port group sends the reference signal, an energy value that is of the reference signal sent through each transmit port and that is detected on at least one receive port in the one reception area is greater than or equal to a preset threshold, and the reception area is determined by the second device according to a logical grouping rule.

Optionally, in another embodiment, the first device further includes:

the second sending unit, configured to send rule indication information to the second device, where the rule indication information is used to indicate the logical grouping rule; and the logical grouping rule includes: dividing receive ports of the second device into a plurality of reception areas based on the receive ports of the second device, angles of arrival corresponding to the transmit ports, weights of receive antennas of the second device, or receive port numbers of the second device.

Optionally, in another embodiment, the indication information is used to indicate a channel state information CSI process, and the CSI process specifies the report mode; and the transmit ports through which the first device sends the reference signal are configured in the CSI process, and the transmit ports for the reference signal are located in a same transmit port group or different transmit port groups.

Optionally, in another embodiment, the content of the reported measurement information that is specified in the report mode includes identifiers of N transmit ports corresponding to first N optimal reference signal strength values based on optimal reference signal strength of the reference signal that is sent through the transmit ports of the first device and that is received by the second device, and further includes identifiers of N transmit port groups corresponding to N optimal reception areas corresponding to the first N optimal reference signal strength values, and one transmit port corresponds to one optimal reception area and one optimal reference signal strength value.

Optionally, in another embodiment, the information about the transmit port groups corresponding to the transmit ports further includes an identifier of a transmit port group other than the N transmit port groups in transmit port groups corresponding to the N transmit ports.

Alternatively, in another embodiment, the content of the reported measurement information that is specified in the report mode includes identifiers of M transmit ports corresponding to first M optimal reference signal strength values and identifiers of K transmit ports corresponding to last K worst reference signal strength values based on optimal reference signal strength of the reference signal that is sent through the transmit ports of the first device and that is received by the second device, and further includes identifiers of M transmit port groups corresponding to the first M optimal reference signal strength values and identifiers of K transmit port groups corresponding to the last K worst reference signal strength values, and one transmit port corresponds to one optimal reception area group number and one optimal reference signal strength value.

Alternatively, in another embodiment, the content of the reported measurement information that is specified in the report mode includes numbers of Z transmit ports corresponding to first Z optimal reference signal strength values based on signal strength of the reference signal that is sent through transmit ports in each transmit port group of the first device and that is received by the second device.

Alternatively, in another embodiment, the content of the reported measurement information that is specified in the report mode includes an identifier of a transmit port corresponding to a highest signal strength value based on signal strength of the reference signal that is sent through transmit ports in each transmit port group of the first device and that is received by the second device, and further includes an identifier of one or more other transmit ports in a transmit port group in which the transmit port corresponding to the highest signal strength value is located.

Optionally, in another embodiment, the first device further includes:

a first determining unit, configured to determine, based on measurement information sent by each of a plurality of second devices, at least one transmit port set for simultaneous downlink transmission with the plurality of second devices, where a quantity of transmit ports included in each of the at least one transmit port set is equal to a quantity of the plurality of second devices, and one transmit port corresponds to one second device.

Optionally, in another embodiment, the at least one transmit port set includes at least two transmit port sets, and the first device further includes:

a communications unit, configured to transmit a second signal with the plurality of second devices through each transmit port in each of the at least two transmit port sets, and a second determining unit, configured to determine a transmit port set with best system performance from the at least two transmit port sets based on strength values of the second signal to perform downlink transmission with the plurality of second devices.

It should be understood that, the first device 500 shown in FIG. 5 can implement processes related to the first device in the method embodiment in FIG. 2. Operations and/or functions of modules in the first device 500 are respectively used to implement corresponding procedures in the method embodiment in FIG. 2. For details, refer to the descriptions in the method embodiment. To avoid repetition, detailed descriptions are appropriately omitted herein.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using the reception area of the second device, so that the first device can determine the transmit port set for downlink transmission based on the measurement information. In other words, in this embodiment of this application, the first device can determine, based on the measurement information determined by using the reception information, the plurality of transmit ports for sending data. Considering impact of a receive port on a MU-MIMO signal, the first device selects suitable transmit ports for simultaneous signal transmission, to avoid or reduce interference between a plurality of signals.

FIG. 6 is a schematic block diagram of a second device 600 according to an embodiment of this application. Specifically, as shown in FIG. 6, the second device 600 includes:

a first receiving unit 610, configured to receive indication information sent by a first device, where the indication information is used to indicate a report mode, and the report mode specifies content of measurement information to be reported by the second device; and a sending unit 620, configured to send the measurement information to the first device, where the first device receives measurement information sent by second devices, the measurement information includes a measurement result, the measurement result is obtained by the second device based on a reference signal sent by the first device, the reference signal is sent through transmit ports of the first device, the measurement information includes information about transmit port groups corresponding to the transmit ports, and the transmit port groups corresponding to the transmit ports are determined by using reception information of the second device.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using a reception area of the second device, so that the first device can determine a transmit port set for downlink transmission based on the measurement information. In other words, in this embodiment of this application, the first device can determine, based on the measurement information determined by using the reception information, a plurality of transmit ports for sending data. Considering impact of a receive port on a MU-MIMO signal, the first device selects suitable transmit ports for simultaneous signal transmission, to avoid or reduce interference between a plurality of signals.

Optionally, in another embodiment, the reception information of the second device includes information about a reception area of the second device; and one transmit port group corresponds to one reception area of the second device, an energy value that is of the reference signal sent through each transmit port in the one transmit port group and that is detected on at least one receive port in the one reception area is greater than or equal to a preset threshold, and the reception area is determined by the second device according to a logical grouping rule.

Optionally, in another embodiment, the second device further includes:

a second receiving unit, configured to receive rule indication information sent by the first device, where the rule indication information is used to indicate the logical grouping rule; and the logical grouping rule includes: dividing receive ports of the second device into a plurality of reception areas based on the receive ports of the second device, angles of arrival corresponding to the transmit ports, weights of receive antennas of the second device, or receive port numbers of the second device.

Optionally, in another embodiment, the indication information is used to indicate a channel state information CSI process, and the CSI process specifies the report mode; and the transmit ports through which the first device sends the reference signal are configured in the CSI process, and the transmit ports for the reference signal are located in a same transmit port group or different transmit port groups.

Optionally, in another embodiment, the information about the transmit port groups corresponding to the transmit ports includes identifiers of N transmit ports corresponding to first N optimal reference signal strength values based on optimal reference signal strength of the reference signal that is sent through the transmit ports of the first device and that is received by the second device, and further includes identifiers of N transmit port groups corresponding to N optimal reception areas corresponding to the first N optimal reference signal strength values, and one transmit port corresponds to one optimal reception area and one optimal reference signal strength value.

Optionally, in another embodiment, the information about the transmit port groups corresponding to the transmit ports further includes an identifier of a transmit port group other than the N transmit port groups in transmit port groups corresponding to the N transmit ports.

Alternatively, in another embodiment, the information about the transmit port groups corresponding to the transmit ports includes identifiers of M transmit ports corresponding to first M optimal reference signal strength values and identifiers of K transmit ports corresponding to last K worst reference signal strength values based on optimal reference signal strength of the reference signal that is sent through the transmit ports of the first device and that is received by the second device, and further includes identifiers of M transmit port groups corresponding to the first M optimal reference signal strength values and identifiers of K transmit port groups corresponding to the last K worst reference signal strength values, and one transmit port corresponds to one optimal reception area group number and one optimal reference signal strength value.

Alternatively, in another embodiment, the information about the transmit port groups corresponding to the transmit ports includes numbers of Z transmit ports corresponding to first Z optimal reference signal strength values based on signal strength of the reference signal that is sent through transmit ports in each transmit port group of the first device and that is received by the second device.

Alternatively, in another embodiment, the information about the transmit port groups corresponding to the transmit ports includes an identifier of a transmit port corresponding to a highest signal strength value based on signal strength of the reference signal that is sent through transmit ports in each transmit port group of the first device and that is received by the second device, and further includes an identifier of one or more other transmit ports in a transmit port group in which the transmit port corresponding to the highest signal strength value is located.

Optionally, in another embodiment, the measurement information sent by the second device is used by the first device to determine at least one transmit port set for simultaneous downlink transmission with a plurality of second devices, a quantity of transmit ports included in each of the at least one transmit port set is equal to a quantity of the plurality of second devices, and one transmit port corresponds to one second device.

Alternatively, in another embodiment, the at least one transmit port set includes at least two transmit port sets, and the second device further includes:

a determining unit, configured to transmit a second signal with the first device, to trigger the first device to determine a transmit port set with best system performance from the at least two transmit port sets based on strength values of the second signal to perform downlink transmission with the plurality of second devices.

It should be understood that, the second device 600 shown in FIG. 6 can implement processes related to the second device in the method embodiment in FIG. 2. Operations and/or functions of modules in the second device 600 are respectively used to implement corresponding procedures in the method embodiment in FIG. 2. For details, refer to the descriptions in the method embodiment. To avoid repetition, detailed descriptions are appropriately omitted herein.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using the reception area of the second device, so that the first device can determine the transmit port set for downlink transmission based on the measurement information. In other words, in this embodiment of this application, the first device can determine, based on the measurement information determined by using the reception information, the plurality of transmit ports for sending data. Considering impact of a receive port on a MU-MIMO signal, the first device selects suitable transmit ports for simultaneous signal transmission, to avoid or reduce interference between a plurality of signals.

FIG. 7 is a schematic block diagram of a first device 700 according to an embodiment of this application. Specifically, as shown in FIG. 7, the first device 700 includes: a processor 710 and a transceiver 720. The processor 710 is connected to the transceiver 720. Optionally, the first device 700 further includes a memory 730, and the memory 730 is connected to the processor 710. Further optionally, the first device 700 may further include a bus system 740. The processor 710, the memory 730, and the transceiver 720 may be connected by using the bus system 740. The memory 730 may be configured to store an instruction. The processor 710 is configured to execute the instruction stored in the memory 730, to control the transceiver 720 to receive or send information or signals.

Specifically, the processor 710 controls the transceiver 720 to send indication information to the second device, where the indication information is used to indicate a report mode, and the report mode specifies content of measurement information to be reported by the second device; and receive the measurement information sent by the second device, where the measurement information includes a measurement result, the measurement result is obtained by the second device based on a reference signal sent by the first device, the reference signal is sent through transmit ports of the first device, the measurement information includes information about transmit port groups corresponding to the transmit ports, and the transmit port groups corresponding to the transmit ports are determined by using reception information of the second device.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using a reception area of the second device, so that the first device can determine a transmit port set for downlink transmission based on the measurement information. In other words, in this embodiment of this application, the first device can determine, based on the measurement information determined by using the reception information, a plurality of transmit ports for sending data. Considering impact of a receive port on a MU-MIMO signal, the first device selects suitable transmit ports for simultaneous signal transmission, to avoid or reduce interference between a plurality of signals.

It should be understood that in this embodiment of this application, the processor 710 may be a central processing unit (CPU), or the processor 710 may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

The memory 730 may include a read-only memory and a random access memory, and provide an instruction and data to the processor 710. A part of the memory 730 may further include a non-volatile random access memory. For example, the memory 730 may further store device type information.

In addition to a data bus, the bus system 740 may further include a power bus, a control bus, a status signal bus, and the like. However, for clarity, various buses are marked as the bus system 740 in the figure.

In an implementation process, steps in the foregoing method may be implemented by using a hardware integrated logical circuit in the processor 710 or instructions in a form of software. The steps of the method disclosed with reference to the embodiments of this application may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 730, and the processor 710 reads information in the memory 730 and completes the steps in the foregoing method in combination with hardware of the processor. To avoid repetition, details are not described herein again.

Optionally, in another embodiment, the reception information of the second device includes information about a reception area of the second device; and one transmit port group corresponds to one reception area of the second device, each transmit port in the one transmit port group sends the reference signal, an energy value that is of the reference signal sent through each transmit port and that is detected on at least one receive port in the one reception area is greater than or equal to a preset threshold, and the reception area is determined by the second device according to a logical grouping rule.

Optionally, in another embodiment, the transceiver 720 is further configured to send rule indication information to the second device, where the rule indication information is used to indicate the logical grouping rule; and the logical grouping rule includes: dividing receive ports of the second device into a plurality of reception areas based on the receive ports of the second device, angles of arrival corresponding to the transmit ports, weights of receive antennas of the second device, or receive port numbers of the second device.

Optionally, in another embodiment, the indication information is used to indicate a channel state information CSI process, and the CSI process specifies the report mode; and the transmit ports through which the first device sends the reference signal are configured in the CSI process, and the transmit ports for the reference signal are located in a same transmit port group or different transmit port groups.

Optionally, in another embodiment, the content of the reported measurement information that is specified in the report mode includes identifiers of N transmit ports corresponding to first N optimal reference signal strength values based on optimal reference signal strength of the reference signal that is sent through the transmit ports of the first device and that is received by the second device, and further includes identifiers of N transmit port groups corresponding to N optimal reception areas corresponding to the first N optimal reference signal strength values, and one transmit port corresponds to one optimal reception area and one optimal reference signal strength value.

Optionally, in another embodiment, the content of the reported measurement information that is specified in the report mode further includes an identifier of a transmit port group other than the N transmit port groups in transmit port groups corresponding to the N transmit ports.

Alternatively, in another embodiment, the content of the reported measurement information that is specified in the report mode includes identifiers of M transmit ports corresponding to first M optimal reference signal strength values and identifiers of K transmit ports corresponding to last K worst reference signal strength values based on optimal reference signal strength of the reference signal that is sent through the transmit ports of the first device and that is received by the second device, and further includes identifiers of M transmit port groups corresponding to the first M optimal reference signal strength values and identifiers of K transmit port groups corresponding to the last K worst reference signal strength values, and one transmit port corresponds to one optimal reception area group number and one optimal reference signal strength value.

Alternatively, in another embodiment, the content of the reported measurement information that is specified in the report mode includes numbers of Z transmit ports corresponding to first Z optimal reference signal strength values based on signal strength of the reference signal that is sent through transmit ports in each transmit port group of the first device and that is received by the second device.

Alternatively, in another embodiment, the content of the reported measurement information that is specified in the report mode includes an identifier of a transmit port corresponding to a highest signal strength value based on signal strength of the reference signal that is sent through transmit ports in each transmit port group of the first device and that is received by the second device, and further includes an identifier of one or more other transmit ports in a transmit port group in which the transmit port corresponding to the highest signal strength value is located.

Optionally, in another embodiment, the processor 710 is further configured to determine, based on measurement information sent by each of a plurality of second devices, at least one transmit port set for simultaneous downlink transmission with the plurality of second devices, where a quantity of transmit ports included in each of the at least one transmit port set is equal to a quantity of the plurality of second devices, and one transmit port corresponds to one second device.

Optionally, in another embodiment, the at least one transmit port set includes at least two transmit port sets, and the processor 710 is further configured to transmit a second signal with the plurality of second devices through each transmit port in each of the at least two transmit port sets; and determine a transmit port set with best system performance from the at least two transmit port sets based on strength values of the second signal to perform downlink transmission with the plurality of second devices.

It should be understood that, the first device 700 shown in FIG. 7 can implement processes related to the first device in the method embodiment in FIG. 2. Operations and/or functions of modules in the first device 700 are respectively used to implement corresponding procedures in the method embodiment in FIG. 2. For details, refer to the descriptions in the method embodiment. To avoid repetition, detailed descriptions are appropriately omitted herein.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using the reception area of the second device, so that the first device can determine the transmit port set for downlink transmission based on the measurement information. In other words, in this embodiment of this application, the first device can determine, based on the measurement information determined by using the reception information, the plurality of transmit ports for sending data. Considering impact of a receive port on a MU-MIMO signal, the first device selects suitable transmit ports for simultaneous signal transmission, to avoid or reduce interference between a plurality of signals.

FIG. 8 is a schematic block diagram of a second device 800 according to an embodiment of this application. Specifically, as shown in FIG. 8, the second device 800 includes: a processor 810 and a transceiver 820. The processor 810 is connected to the transceiver 820. Optionally, the second device 800 further includes a memory 830, and the memory 830 is connected to the processor 810. Further optionally, the second device 800 may further include a bus system 840. The processor 810, the memory 830, and the transceiver 820 may be connected by using the bus system 840. The memory 830 may be configured to store an instruction. The processor 810 is configured to execute the instruction stored in the memory 830, to control the transceiver 820 to receive or send information or signals.

Specifically, the controller 810 controls the transceiver 820 to receive indication information sent by a first device, where the indication information is used to indicate a report mode, and the report mode specifies content of measurement information to be reported by the second device; and send the measurement information to the first device, where the first device receives measurement information sent by second devices, the measurement information includes a measurement result, the measurement result is obtained by the second device based on a reference signal sent by the first device, the reference signal is sent through transmit ports of the first device, the measurement information includes information about transmit port groups corresponding to the transmit ports, and the transmit port groups corresponding to the transmit ports are determined by using reception information of the second device.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using a reception area of the second device, so that the first device can determine a transmit port set for downlink transmission based on the measurement information. In other words, in this embodiment of this application, the first device can determine, based on the measurement information determined by using the reception information, a plurality of transmit ports for sending data. Considering impact of a receive port on a MU-MIMO signal, the first device selects suitable transmit ports for simultaneous signal transmission, to avoid or reduce interference between a plurality of signals.

It should be understood that in this embodiment of this application, the processor 810 may be a central processing unit, or the processor 810 may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

The memory 830 may include a read-only memory and a random access memory, and provide an instruction and data to the processor 810. A part of the memory 830 may further include a non-volatile random access memory. For example, the memory 830 may further store device type information.

In addition to a data bus, the bus system 840 may further include a power bus, a control bus, a status signal bus, and the like. However, for clarity, various buses are marked as the bus system 840 in the figure.

In an implementation process, steps in the foregoing method may be implemented by using a hardware integrated logical circuit in the processor 810 or instructions in a form of software. The steps of the method disclosed with reference to the embodiments of this application may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 830, and the processor 810 reads information in the memory 830 and completes the steps in the foregoing method in combination with hardware of the processor. To avoid repetition, details are not described herein again.

Optionally, in another embodiment, the reception information of the second device includes information about a reception area of the second device; and one transmit port group corresponds to one reception area of the second device, an energy value that is of the reference signal sent through each transmit port in the one transmit port group and that is detected on at least one receive port in the one reception area is greater than or equal to a preset threshold, and the reception area is determined by the second device according to a logical grouping rule.

Optionally, in another embodiment, the transceiver 820 is further configured to receive rule indication information sent by the first device, where the rule indication information is used to indicate the logical grouping rule; and the logical grouping rule includes: dividing receive ports of the second device into a plurality of reception areas based on the receive ports of the second device, angles of arrival corresponding to the transmit ports, weights of receive antennas of the second device, or receive port numbers of the second device.

Optionally, in another embodiment, the indication information is used to indicate a channel state information CSI process, and the CSI process specifies the report mode; and the transmit ports through which the first device sends the reference signal are configured in the CSI process, and the transmit ports for the reference signal are located in a same transmit port group or different transmit port groups.

Optionally, in another embodiment, the information about the transmit port groups corresponding to the transmit ports includes identifiers of N transmit ports corresponding to first N optimal reference signal strength values based on optimal reference signal strength of the reference signal that is sent through the transmit ports of the first device and that is received by the second device, and further includes identifiers of N transmit port groups corresponding to N optimal reception areas corresponding to the first N optimal reference signal strength values, and one transmit port corresponds to one optimal reception area and one optimal reference signal strength value.

Optionally, in another embodiment, the information about the transmit port groups corresponding to the transmit ports further includes an identifier of a transmit port group other than the N transmit port groups in transmit port groups corresponding to the N transmit ports.

Alternatively, in another embodiment, the information about the transmit port groups corresponding to the transmit ports includes identifiers of M transmit ports corresponding to first M optimal reference signal strength values and identifiers of K transmit ports corresponding to last K worst reference signal strength values based on optimal reference signal strength of the reference signal that is sent through the transmit ports of the first device and that is received by the second device, and further includes identifiers of M transmit port groups corresponding to the first M optimal reference signal strength values and identifiers of K transmit port groups corresponding to the last K worst reference signal strength values, and one transmit port corresponds to one optimal reception area group number and one optimal reference signal strength value.

Alternatively, in another embodiment, the information about the transmit port groups corresponding to the transmit ports includes numbers of Z transmit ports corresponding to first Z optimal reference signal strength values based on signal strength of the reference signal that is sent through transmit ports in each transmit port group of the first device and that is received by the second device.

Alternatively, in another embodiment, the information about the transmit port groups corresponding to the transmit ports includes an identifier of a transmit port corresponding to a highest signal strength value based on signal strength of the reference signal that is sent through transmit ports in each transmit port group of the first device and that is received by the second device, and further includes an identifier of one or more other transmit ports in a transmit port group in which the transmit port corresponding to the highest signal strength value is located.

Optionally, in another embodiment, the measurement information sent by the second device is used by the first device to determine at least one transmit port set for simultaneous downlink transmission with a plurality of second devices, a quantity of transmit ports included in each of the at least one transmit port set is equal to a quantity of the plurality of second devices, and one transmit port corresponds to one second device.

Alternatively, in another embodiment, the at least one transmit port set includes at least two transmit port sets, and the processor 810 is further configured to transmit a second signal with the first device, to trigger the first device to determine a transmit port set with best system performance from the at least two transmit port sets based on strength values of the second signal to perform downlink transmission with the plurality of second devices.

It should be understood that, the second device 800 shown in FIG. 8 can implement processes related to the second device in the method embodiment in FIG. 2. Operations and/or functions of modules in the second device 800 are respectively used to implement corresponding procedures in the method embodiment in FIG. 2. For details, refer to the descriptions in the method embodiment. To avoid repetition, detailed descriptions are appropriately omitted herein.

In this embodiment of this application, the first device may configure the report mode and the content of the reported measurement information of the second device, so as to obtain suitable feedback information, properly schedule transmit resources to be allocated to different second devices, and reduce interference between a plurality of resources.

Specifically, in this embodiment of this application, the first device (for example, a network device) sends the indication information to instruct the second device (for example, a terminal device) to feed back the measurement information that is determined by using the reception area of the second device, so that the first device can determine the transmit port set for downlink transmission based on the measurement information. In other words, in this embodiment of this application, the first device can determine, based on the measurement information determined by using the reception information, the plurality of transmit ports for sending data. Considering impact of a receive port on a MU-MIMO signal, the first device selects suitable transmit ports for simultaneous signal transmission, to avoid or reduce interference between a plurality of signals.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" that appears throughput the whole specification does not necessarily mean a same embodiment. Moreover, the particular features, structures, or characteristics may be combined in one or more embodiments in any suitable manner. It should be understood that in various embodiments of this application, sequence numbers of the foregoing processes do not mean particular execution sequences. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on only A, and B may also be determined based on A and/or other information.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief descriptions, for a detailed working process of the foregoing system, apparatus, and unit, reference may be made to a corresponding process in the foregoing method embodiments, and details are not described herein.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that this application may be implemented by hardware, firmware or a combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. For example but not for limitation, the computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in a definition of a medium to which they belong. As used in this application, disks and discs include a compact disc (CD), a laser disc, an optical disc, a digital versatile disc (DVD), a floppy disk, and a Blu-ray disc. The disk generally copies data by a magnetic means, and the disc optically copies data by a laser means. The foregoing combination should also be included in the protection scope of the computer-readable medium.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. An information transmission method, comprising:
sending, by a first device, indication information to a second device for indicating a report mode, wherein the report mode comprises content of measurement information to be reported by the second device;
sending, by the first device, a reference signal through transmit ports of the first device;
after the sending the reference signal, receiving, by the first device, the measurement information sent by the second device in response to the sending the reference signal, wherein the measurement information received from the second device comprises:
a measurement result obtained by the second device based on the reference signal sent by the first device, and
information about transmit port groups corresponding to the transmit ports that are determined by using reception information of the second device;
after the sending the reference signal, receiving, by the first device, second measurement information sent by a third device in response to the sending the reference signal, wherein the second measurement information received from the third device comprises:
a second measurement result obtained by the third device based on the reference signal sent by the first device, and
second information about second transmit port groups corresponding to the transmit, ports that are determined by using second reception information of the third device:
selecting, by the first device, a transmit port group for transmitting to the second device based on the measurement information received from the second device and the second measurement information received from the third device; and
transmit, by the first device to the second device, data using the transmit port group.

2. The method according to claim 1, wherein:
the reception information of the second device comprises transmit port grouping information about a reception area of the second device; and
wherein each one of the transmit port groups corresponds to one reception area of the second device, each transmit port in each one of the transmit port groups sends the reference signal, wherein an energy value of the reference signal sent through each transmit port and that is detected on at least one receive port in the one reception area is greater than or equal to a preset threshold, and wherein the reception area is determined by the second device according to a logical grouping rule.

3. The method according to claim 2, further comprising:
sending, by the first device, rule indication information to the second device for indicating the logical grouping rule; and
the logical grouping rule comprises: dividing receive ports of the second device into a plurality of reception areas based on the receive ports of the second device, angles of arrival corresponding to the transmit ports, weights of receive antennas of the second device, or receive port numbers of the second device.

4. The method according to claim 1, wherein:
the indication information is further for indicating a channel state information (CSI) process that comprises the report mode; and
the transmit ports through which the first device sends the reference signal are configured in the CSI process, and the transmit ports for the reference signal are located in a same transmit port group or different transmit port groups.

5. The method according to claim 1, wherein the content of the measurement information comprises:
identifiers of N transmit ports corresponding to first N optimal reference signal strength values based on optimal reference signal strength of the reference signal that is sent through the transmit ports of the first device to the second device; and
identifiers of N transmit port groups corresponding to N optimal reception areas corresponding to the first N optimal reference signal strength values, and wherein one transmit port corresponds to one optimal reception area and one optimal reference signal strength value.

6. The method according to claim 5, wherein the content of the measurement information further comprises:
an identifier of a transmit port group other than the N transmit port groups corresponding to the N transmit ports.

7. The method according to claim 1, wherein the content of the measurement information comprises:
identifiers of M transmit ports corresponding to first M optimal reference signal strength values and identifiers of K transmit ports corresponding to last K worst reference signal strength values based on optimal reference signal strength of the reference signal that is sent through the transmit ports of the first device to the second device; and
identifiers of M transmit port groups corresponding to the first M optimal reference signal strength values and identifiers of K transmit port groups corresponding to the last K worst reference signal strength values, and wherein one transmit port corresponds to one optimal reception area group number and one optimal reference signal strength value.

8. The method according to claim 1, wherein the content of the measurement information comprises:
numbers of Z transmit ports corresponding to first Z optimal reference signal strength values based on signal strength of the reference signal that is sent through transmit ports in each transmit port group of the first device to the second device.

9. The method according to claim 1, wherein the content of the measurement information comprises:
an identifier of a transmit port corresponding to a highest signal strength value based on signal strength of the reference signal that is sent through transmit ports in each transmit port group of the first device to the second device; and
an identifier of one or more other transmit ports in a transmit port group in which the transmit port corresponding to the highest signal strength value is located.

10. The method of claim 1, wherein the information about the transmit port groups includes information about a plurality of transmit port groups that are determined by the second device by dividing a plurality of transmit ports of the first device into the plurality of transmit port groups using the reception information of the second device.

11. A first device, comprising:
    at least one processor;
    memory coupled to the at least one processor and comprising instructions that, when executed by the at least one processor, cause the first device to:
        send indication information to a second device for indicating a report mode, wherein the report mode comprises content of measurement information to be reported by the second device;
        send a reference signal through transmit ports of the first device; and
        after the reference signal is sent, receive the measurement information sent by the second device, wherein the measurement information comprises:
            a measurement result obtained by the second device based on the reference signal sent by the first device, and
            information about transmit port groups corresponding to the transmit ports that are determined by using reception information of the second device;
        after the reference signal is sent, receive second measurement information sent by a third device in response to the reference signal, wherein the second measurement information received from the third device comprises:
            a second measurement result obtained by the third device based on the reference signal sent by the first device, and
            second information about second transmit port groups corresponding to the transmit ports that are determined by using second reception information of the third device:
        select a transmit port group for transmitting to the second device based on the measurement information received from the second device and the second measurement information received from the third device; and
        transmit, to the second device, data using the transmit port group.

12. The first device according to claim 11, wherein:
    the reception information of the second device comprises transmit port grouping information about a reception area of the second device; and
    wherein each one of the transmit port groups corresponds to one reception area of the second device, wherein each transmit port in each one of the transmit port groups sends the reference signal, wherein an energy value that is of the reference signal sent through each transmit port and that is detected on at least one receive port in the one reception area is greater than or equal to a preset threshold, and wherein the reception area is determined by the second device according to a logical grouping rule.

13. The first device according to claim 12, wherein the instructions, when executed by the at least one processor, further cause the first device to:
    send rule indication information to the second device for indicating the logical grouping rule, wherein the logical grouping rule comprises: dividing receive ports of the second device into a plurality of reception areas based on the receive ports of the second device, angles of arrival corresponding to the transmit ports, weights of receive antennas of the second device, or receive port numbers of the second device.

14. The first device according to claim 11, wherein:
    the indication information is for further indicating a channel state information (CSI) process that comprises the report mode; and
    the transmit ports through which the first device sends the reference signal are configured in the CSI process, and the transmit ports for the reference signal are located in a same transmit port group or different transmit port groups.

15. The first device according to claim 11, wherein the content of the measurement information comprises:
    identifiers of N transmit ports corresponding to first N optimal reference signal strength values based on optimal reference signal strength of the reference signal that is sent through the transmit ports of the first device to the second device; and
    identifiers of N transmit port groups corresponding to N optimal reception areas corresponding to the first N optimal reference signal strength values, and wherein one transmit port corresponds to one optimal reception area and one optimal reference signal strength value.

16. The first device according to claim 15, wherein the content of the measurement information further comprises:
    an identifier of a transmit port group other than the N transmit port groups corresponding to the N transmit ports.

17. The first device according to claim 11, wherein the content of the measurement information comprises:
    identifiers of M transmit ports corresponding to first M optimal reference signal strength values and identifiers of K transmit ports corresponding to last K worst reference signal strength values based on optimal reference signal strength of the reference signal that is sent through the transmit ports of the first device to the second device; and
    identifiers of M transmit port groups corresponding to the first M optimal reference signal strength values and identifiers of K transmit port groups corresponding to the last K worst reference signal strength values, and wherein one transmit port corresponds to one optimal reception area group number and one optimal reference signal strength value.

18. The first device according to claim 11, wherein the content of the measurement information comprises:
    numbers of Z transmit ports corresponding to first Z optimal reference signal strength values based on signal strength of the reference signal that is sent through transmit ports in each transmit port group of the first device to the second device.

19. The first device according to claim 11, wherein the content of the measurement information comprises:
    an identifier of a transmit port corresponding to a highest signal strength value based on signal strength of the reference signal that is sent through transmit ports in each transmit port group of the first device to the second device; and
    an identifier of one or more other transmit ports in a transmit port group in which the transmit port corresponding to the highest signal strength value is located.

20. A second device, comprising:
    at least one processor;
    memory coupled to the at least one processor and comprising instructions that, when executed by the at least one processor, cause the second device to:

receive, from a first device, indication information for indicating a report mode, wherein the report mode comprises content of measurement information to be reported by the second device;

receive a reference signal transmitted through transmit ports of the first device; and after the reference signal is received, send, to the first device, the measurement information, wherein the measurement information sent by the second device comprises:

a measurement result obtained by the second device based on the reference signal received by of the second device, and information about transmit port groups corresponding to the transmit ports that are determined by using reception information of the second device, wherein the first device receives second measurement information sent by a third device in response to the reference signal, wherein the second measurement information from the third device comprises:

a second measurement result obtained by the third device based on the reference signal sent by the first device, and second information about second transmit port groups corresponding to the transmit ports that are determined by using second reception information of the third device; and receive, from the first device, data using the transmit port group of the first device selected based on the measurement information from the second device and the second measurement information from the third device.

* * * * *